United States Patent [19]

Tsukada et al.

[11] Patent Number: 5,665,922
[45] Date of Patent: Sep. 9, 1997

[54] BENDING STRAIN MEASUREMENT APPARATUS FOR AN ABDOMEN OF AN ANTHROPOMORPHIC DUMMY AND ABDOMINAL INJURY PRESUMPTION APPARATUS USING THE SAME

[75] Inventors: Kouji Tsukada; Hidekazu Nishigaki; Yasuaki Ikeda; Shigeru Sakuma; Shin-ichi Ishiyama; Fumio Matsuoka; Yoshihisa Kanno, all of Aichi-ken, Japan; Shigeki Hayashi, West Bloomfield, Mich.

[73] Assignees: Kabushiki Kaisha Toyota Chuo Kenkyusho, Aichi-ken; Toyota Jidosha Kabushiki Kaisha, Toyota, both of Japan

[21] Appl. No.: 548,476

[22] Filed: Oct. 26, 1995

[30] Foreign Application Priority Data

Oct. 27, 1994 [JP] Japan .................................. 6-301315

[51] Int. Cl.⁶ .............................. G01N 3/20; G01M 19/00
[52] U.S. Cl. .............................................. 73/849; 73/866.4
[58] Field of Search .............................. 73/849, 850, 851, 73/852, 853, 854, 866.4

[56] References Cited

U.S. PATENT DOCUMENTS

| | | | |
|---|---|---|---|
| 3,753,302 | 8/1973 | Daniel | 35/17 |
| 4,349,339 | 9/1982 | Daniel | 434/274 |
| 4,691,556 | 9/1987 | Mellander et al. | 73/866.4 |
| 4,701,132 | 10/1987 | Groesch et al. | 73/866.4 |
| 5,379,646 | 1/1995 | Andrezejak et al. | 73/866.4 |
| 5,526,707 | 6/1996 | Smrcka | 73/866.4 |

FOREIGN PATENT DOCUMENTS

| | | |
|---|---|---|
| 2 683 320 | 5/1993 | France . |
| 2 700 206 | 7/1994 | France . |
| 3-12190 | 1/1991 | Japan . |
| 5-113311 | 5/1993 | Japan . |

OTHER PUBLICATIONS

Stephen W. Rouhana et al., Assessing Submarining and Abdominal Injury Risk in the Hybrid III Family of Dummies: Part II–Development of the Small Female Frangible Abdomen; Biomedical Science Dept., General Motors Research Laboratories, pp. 145–73.

Stephen W. Rouhana et al., Assessing Submarining and Abdominal Injury Risk in the Hybrid III Family of Dummies; Biomedical Science Dept., General Motors Research Labs., pp. 257–79.

Rolf H. Eppinger, on the Development of a Deformation Measurement System and Its Application Toward Developing Mechanically Based Injury Indices; National Highway Traffic Safety Administration, U.S. Dept. of Transportation, pp. 21–28.

*Primary Examiner*—George M. Dombroske
*Assistant Examiner*—Max H. Noori
*Attorney, Agent, or Firm*—Oblon, Spivak, McClelland, Maier & Neustadt, P.C.

[57] ABSTRACT

A bending strain measurement apparatus for an abdomen of an anthropomorphic dummy comprises a band constituted of an elastic thin plate member. The band is arranged in a longitudinal direction of the abdomen, has one end thereof fixed in the vicinity of the abdomen of the dummy, and a plurality of gauges are arranged in a longitudinal direction of the band for detecting a bending strain of the abdomen when an obstacle collides with the abdomen. A measuring device measures time history of the bending strain based on bending strain of the respective portions of the band detected by the gauges arranged on the band, as a time transition of the bending strain of respective portions of the band.

25 Claims, 22 Drawing Sheets

F I G. 5
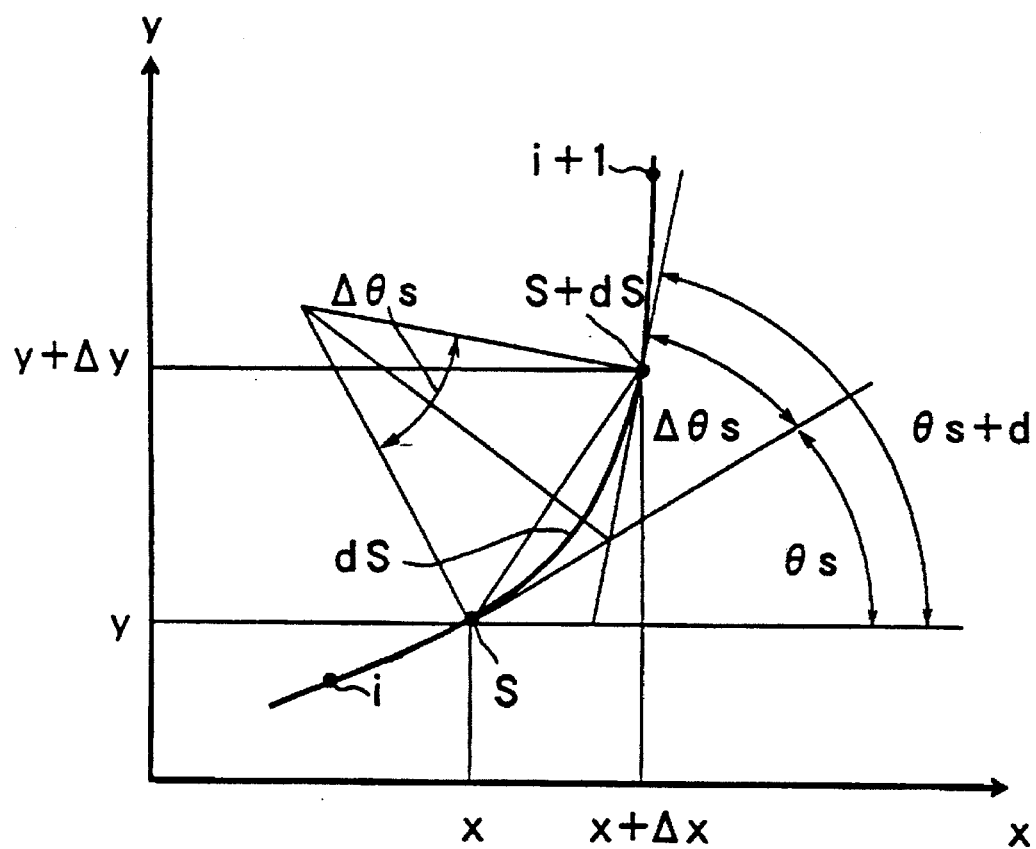

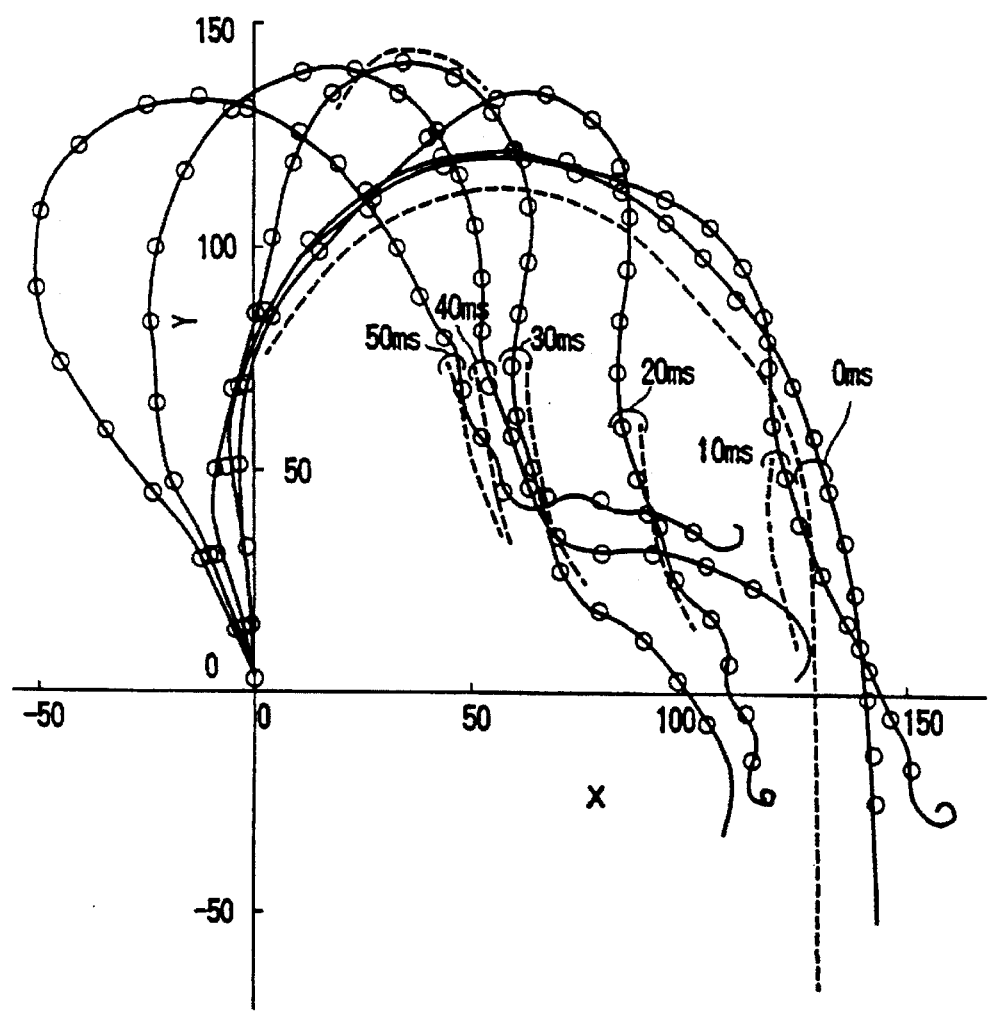
F I G. 1 4

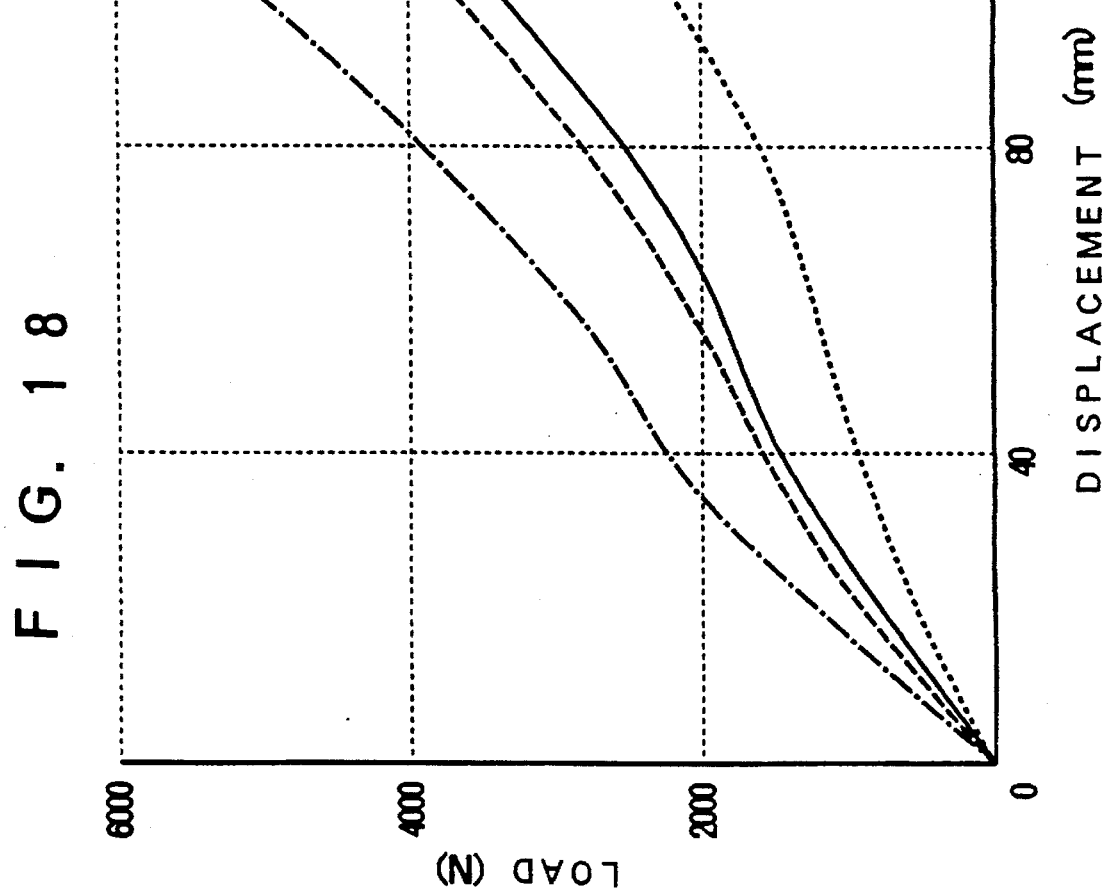

BENDING STRAIN MEASUREMENT APPARATUS FOR AN ABDOMEN OF AN ANTHROPOMORPHIC DUMMY AND ABDOMINAL INJURY PRESUMPTION APPARATUS USING THE SAME

BACKGROUND OF THE INVENTION

1. Field of the Invention

This invention relates to a dummy abdominal deformation measurement apparatus, attached to an anthropomorphic dummy for collision tests, capable of measuring a time history of an abdominal deformation of such an anthropomorphic dummy as well as of presuming abdominal injuries.

2. Description of Related Art

As shown in FIGS. 16(a), 16(b) a conventional dummy chest deformation measurement apparatus (SAE 892426) has a loop-shaped steel band S provided with gauges G1 to G4 which constitute a bridge circuit and with a cable B and a harness C. A dummy chest M enveloped by ribs is wound with the band S whose entire deformation is detected with the gauges G1 to G4.

Another conventional dummy abdomen deformation measurement apparatus (SAE 892440, 902317) as shown in FIGS. 17(a), 17(b) uses a material whose load-deformation characteristics are coincident with one of a human being, whose elastic deformation is very small, and whose plastic deformation dominates deformation of the body, and detects the maximum deformation of the dummy's abdomen with a member U having plural spoke wise extending projections T whose outline is made to fit to the shape of the abdomen of a standard anthropomorphic dummy (Hybrid III).

The conventional dummy chest deformation measurement apparatus, which detects with the gauges G1 to G4 the entire deformation of the loop-shaped steel band S rounded over the dummy chest M enveloped by ribs, has a problem that such an apparatus is not suitable to detect local deformations at the abdomen at which no rib exists in the chest M but a spinal column exists, because local deformations of the abdomen at portions to which obstacles collide are required to be detected. The conventional dummy abdomen deformation measurement apparatus also has a problem that such an apparatus is unable to presume abdominal injuries, because the apparatus detects only the maximum deformation of the dummy's abdomen with the member U and does not measure a time history of the deformation of the dummy's abdomen.

SUMMARY OF THE INVENTION

It is an object of the present invention to provide a bending strain measurement apparatus of the abdomen of an anthropomorphic dummy for detecting a dummy's abdominal deformation as local deformation and to provide a presumption apparatus of abdominal injuries using the same.

It is another object of the present invention to provide a bending strain measurement apparatus for the abdomen of an anthropomorphic dummy and a presumption apparatus of abdominal injury using the same capable of presuming abdominal injuries.

It is a further object of the present invention to provide a bending strain measurement apparatus for the abdomen of an anthropomorphic dummy and a presumption apparatus of abdominal injury using the same based on this invention's technological idea that: abdominal deformation when an obstacle collides with a dummy's abdomen is detected by multiple gauges arranged on and in a longitudinal direction of an elastic thin plate member constituting a band which is fixed in the vicinity of the abdomen by one end and is arranged along in a longitudinal direction on a front face of the abdomen; time history of the deformation, as a transition of deformations of respective portions of the band with respect to time, is measured based on the detected deformations of the respective portions of the band.

It is a still further object of the present invention to provide a bending strain measurement apparatus for an abdomen of an anthropomorphic dummy comprising a band constituted of an elastic thin plate member, arranged in a longitudinal direction of the abdomen, having one end thereof fixed in the vicinity of the abdomen of the dummy and a plurality of gauges arranged on the band in a longitudinal direction thereof for detecting a bending strain of the abdomen when an obstacle collides with the abdomen; and a measuring device for measuring time history of the bending strain based on bending strain of the respective portions of the band detected by the gauges arranged on the band as a time transition of the bending strain of the respective portions of the band.

It is a yet further object of the present invention to provide an abdominal injury presumption apparatus for an abdomen of an anthropomorphic dummy comprising a band constituted of an elastic thin plate member, arranged in a longitudinal direction of the abdomen, having one end thereof fixed in the vicinity of the abdomen of the dummy and a plurality of gauges arranged on the band in a longitudinal direction thereof for detecting a bending strain of the abdomen when an obstacle collides with the abdomen; a measuring device for measuring time history of the bending strain based on bending strain of the respective portions of the band detected by the gauges arranged on the band as a time transition of the bending strain of respective portions of the band; a deformation and deformational velocity measurement device for measuring time histories of deformation and deformational velocity of the respective portions of the band, based on bending strain of the respective portions of the band detected by the gauges; and an injury presumption device for presuming abdominal injuries based on the time histories of the deformation and deformational velocity.

It is a yet further object of the present invention to provide a bending strain measurement apparatus further comprising a guide member for supporting the band, arranged along a front surface of the abdomen and into which the elastic thin plate member is inserted.

It is another object of the present invention to provide a bending strain measurement apparatus further comprising a friction reduction member for reducing friction on contacting surfaces between the guide member and the elastic thin plate member of the band.

It is a further object of the present invention to provide a bending strain measurement apparatus wherein the guide member is made of a low friction material.

It is a still further object of the present invention to provide a bending strain measurement apparatus wherein the friction reduction member is interposed between the band and the guide member.

A bending strain measurement apparatus of the abdomen of an anthropomorphic dummy according to the present invention detects bending strain of the abdomen when an obstacle collides with the abdomen, with multiple gauges arranged on and along a band constituted of an elastic thin plate member whose one end is fixed and which is arranged along in a longitudinal direction on a front face of the abdomen, thereby measuring the time history of the bending strain, based on the bending strain of the respective portions of the band which is detected with the respective gauges, as time transitions of the bending strain of respective portions of the band with regard to time.

With the presumption apparatus of abdominal injury according to the present invention, the deformation and deformational velocity measuring device measures the time histories of the deformation and deformational velocity, based on the bending strain of the respective portions of the band detected with the respective gauges as time transitions of the deformation and deformational velocity of respective portions of the band, and the injury presumption device presumes abdominal injury based on the time histories of the measured deformation and deformational velocity.

With the bending strain measurement apparatus for the abdomen of an anthropomorphic dummy and the presumption apparatus of abdominal injury using the same according to the present invention, the elastic thin plate member constituting the band is inserted into a guide member formed along with the abdomen, and either a friction reduction member or the guide member itself reduces friction on the contacting surface between the guide member and the elastic thin plate member.

The bending strain measurement apparatus for the abdomen of an anthropomorphic dummy according to the present invention detects bending strain of the abdomen when an obstacle collides with the abdomen with multiple gauges arranged on the band, and the measuring device measures the time history of the bending strain as the time transition of the bending strain of the respective portions of the band with regard to time, thereby effectuating to provide the bending strain's data serving as basic data for the detection of deformation of the dummy's abdomen as a partial deformation and to enable itself to presume abdominal injuries.

The presumption apparatus of abdominal injury according to the present invention measures the time histories of deformation and deformational velocity of the respective portions of the band based on the bending strain of the respective portions of the band and has an advantage to enable itself to presume abdominal injuries.

The bending strain measurement apparatus for the abdomen of an anthropomorphic dummy and the presumption apparatus of abdominal injury using the same according to the present invention has an advantage to enable itself to precisely measure such as deformation, the time histories of the deformation and the deformational velocity, presumptions of abdominal injuries based on them, and the like, since either the friction reduction member or the guide member itself, inserted at the contacting surface between the guide member and the elastic thin plate member, reduces friction exerted on the elastic thin plate member.

BRIEF DESCRIPTION OF THE DRAWINGS

FIG. 5 is an illustration for describing a deformation curve on the abdominal surface in the first embodiment;

FIG. 14 is an illustration showing transitions of deformation of the bend of the second embodiment at impact speed of 2.91 meter per second with a lap belt;

FIG. 18 is a diagram showing load-deflection characteristics of four types abdominal materials;

DESCRIPTION OF PREFERRED EMBODIMENTS

Figure 1:
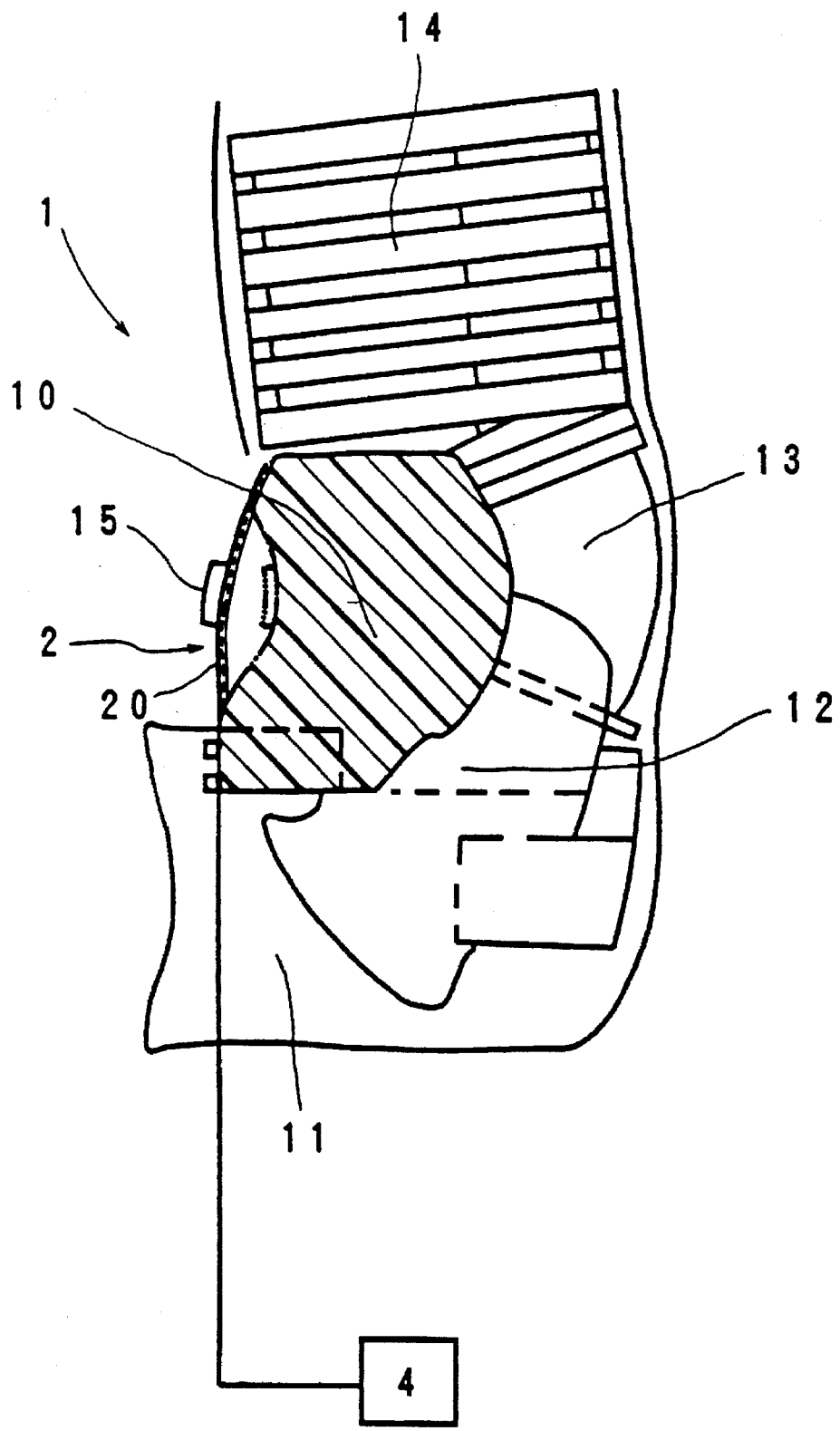
FIG. 1 is a cross-sectional view showing an apparatus of the first embodiment according to the present invention.

Hereinafter, embodiments of the present invention will be described using the drawings.

(First Embodiment)

As shown in FIGS. 1 to 7, a bending strain measurement apparatus for the abdomen of an anthropomorphic dummy of the first preferred embodiment comprises: a band 2, made of a rectangular elastic thin plate member 20 extending in a longitudinal direction on a front surface of an abdomen 10 of an anthropomorphic dummy 1, in which an end thereof is fixed at a lower end of the front surface of the abdomen 10 and in which multiple gauges 3 to detect the deformation of the abdomen 10 when a belt 15 as an obstacle collides with the abdomen are arranged in a longitudinal direction; and a deformation measuring device 4 for measuring a time history of a bending strain based on the detected bending strain of the respective portions of the band 2 by said gauges arranged on the band 2 as a time transition of the bending strain of the respective portions of the band 2.

The dummy 1 is formed with a pelvis 12 arranged on legs 11 placed at the lowest position, the abdomen 10 placed in front of a spinal column 13 arranged on the pelvis 12 and made of foam rubber, such as Neoprene 15 (trademark), and a thorax 14 placed over the abdomen 10.

Figure 2:
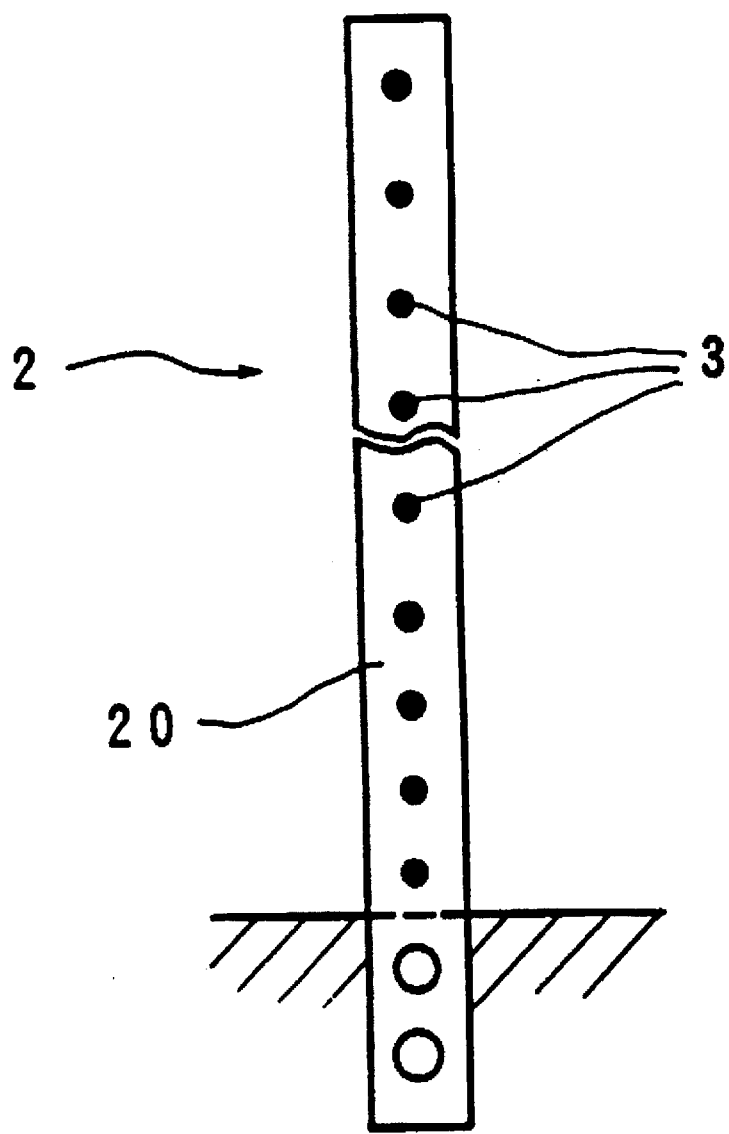
FIG. 2 is a front view showing a band of the first embodiment.

The band 2 comprises the rectangular elastic thin plate member 20 which is made of a stainless steel strip (SUS 301) of 296 mm in length, 12.7 mm in width, and 0.1 mm in thickness, as shown in FIGS. 1 and 2, and is secured at its lower end by two bolts to a fixing portion located at a lower front portion of the abdomen 10.

Figure 3:
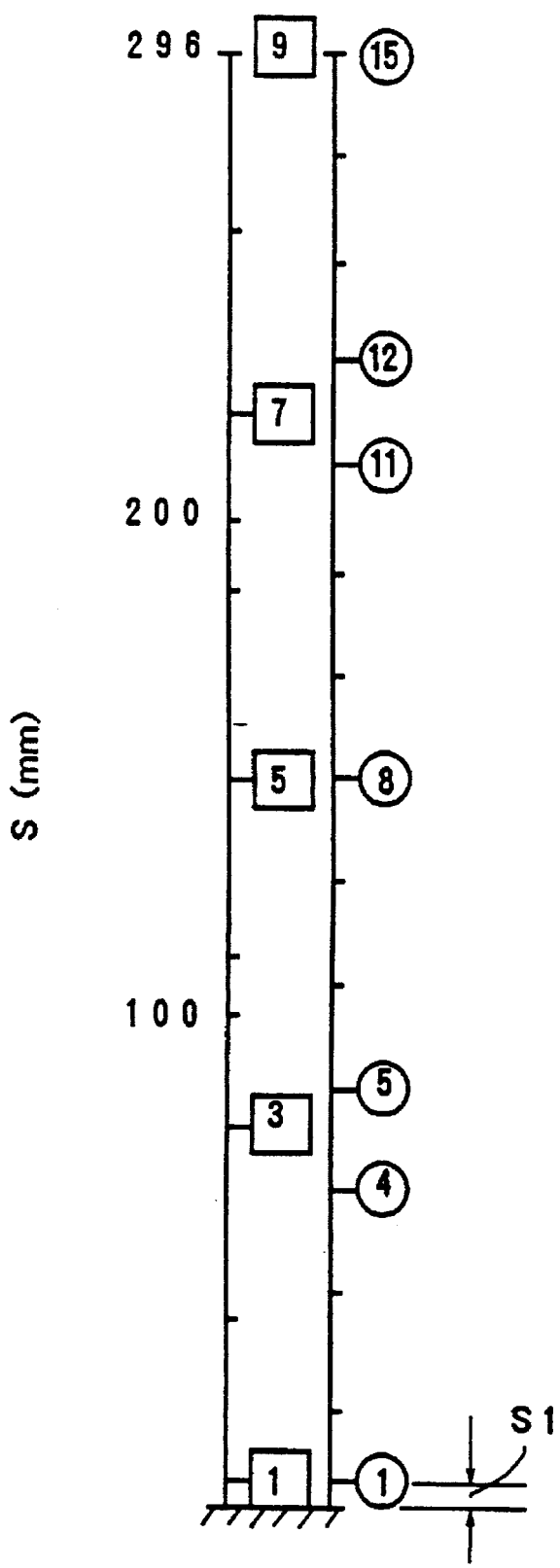
FIG. 3 is a descriptive diagram showing gauge locations on the band of the first embodiment.

A plurality of, for example, fifteen pieces of the gauges 3, are arranged, as shown in FIGS. 2 and 3, on the rectangular elastic thin plate member 20 in a longitudinal direction thereof. Subsequently, a flexible printed circuit forming the elastic thin plate member and a lead wire portion is placed on a Teflon sheet of 0.13 mm in thickness, one side of which is coated with adhesive, to mutually position them. After wiring for measurement is made between the respective gauges on the elastic thin plate member and the flexible printed board, another Teflon sheet of 0.13 mm in thickness is made to cover the top of those, thereby forming a band in a united body. Accordingly, the band is formed with Teflon sheets covering the top and bottom surfaces thereof.

The deformation measuring device 4 is made to be able to measure and calculate a time history of the deformation through obtaining a time transition of the deformation of respective portions based on the deformation of the respective portions of the band 2 detected by the gauges 3 arranged on the band 2 when the belt 15 collides with the dummy 1.

Figure 4:
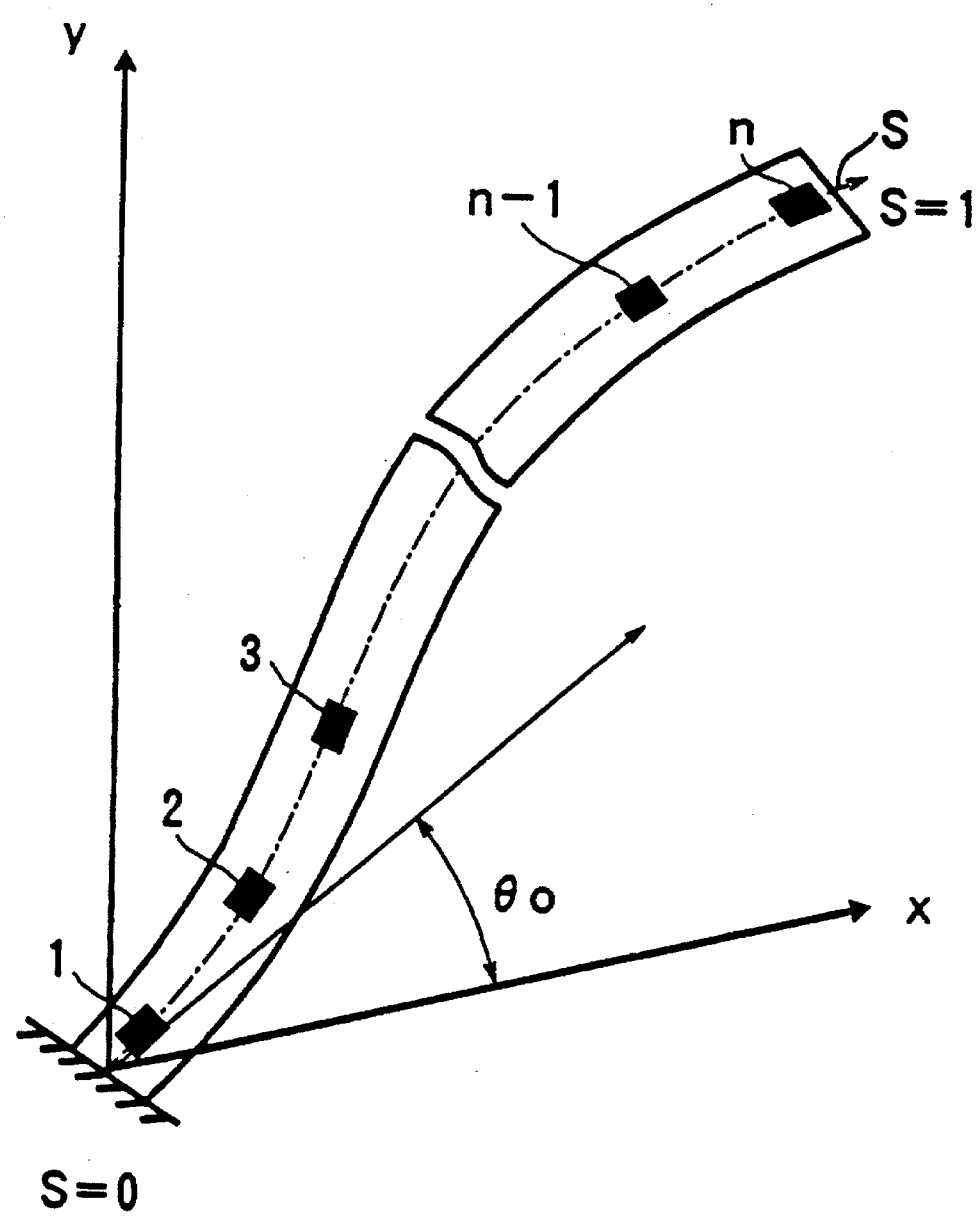
FIG. 4 is a schematic view showing a deformed shape of the band of the first embodiment.

Referring to FIG. 4, calculations of a curvature distribution of the belt when the belt 15 collides, in the deformation measuring device 4, will be described below.

FIG. 4 shows an illustration of a deformed shape of the band 2; the rectangular elastic thin plate member 20 is placed on an X-Y plane; the axis extending in a longitudinal direction of the rectangular elastic thin plate member 20 is designated as "S"; s=0 means a fixed point; s=L means an end and a free end.

Single-axis strain gauges (i=1 to n) of n piece for detecting bending strain are attached on a center line of the rectangular elastic thin plate member 20 so as to be arranged in the longitudinal direction. The stainless steel thin plate constituting the rectangular elastic thin plate member 20 is deformed during the collision of the belt so as to conform with the surface of the abdomen 10, so that bending strain $\epsilon_i$ and curvature $k_i$ of respective points (i=1 to n) where one of the strain gauges is attached, are given by the following Equation 1.

Equation 1

$$k_i = c_a \cdot \epsilon_i$$

wherein $c_s$ is a constant determined by calibration.

A curvature distribution of the whole length of the stainless steel thin plate (s=0 to L) is approximately calculated from n pieces of discrete curvatures $k_i$ in a manner as described below. According to the beam theory in strength of materials, the curvature distribution k(s) is expressed by a quadratic function of s where an equally distributed load is exerted to the strip of the stainless steel thin plate constituting the band 2. Here, a zone from the origin S=0 to the gauge number i=2, including the gauge number i=1, is designated as $D_1$, and subsequently, the curvature distribution k(s) of the zone $D_i$ (i=2, n-1) between point i and point i+1 is approximated by a quadratic equation of s, which is expressed by the following Equation 2.

Equation 2

$$k_{(s)} = a_{i,\,i+1} + b_{i,\,i+1} \cdot s + c_{i,\,i+1} \cdot s^2 : (i=1 \sim n-1)$$

With Equation 2, unknown quantities $a_{i,\,i+1}$, $b_{i,\,i+1}$, $c_{i,\,i+1}$ are determined under the following conditions.

Condition 1; since the curvatures ($k_1$ to $k_n$) at strain gauge positions ($s_1$ to $s_n$) are obtained, $k_i$ and $k_{i+1}$ are expressed by the following Equations 3 and 4.

Equation 3

$$k_i = a_{i,\,i+1} + b_{i,\,i+1} \cdot s_i + c_{i,\,i+1} \cdot s_i^2 : (i=1 \sim n-1)$$

Equation 4

$$k_{i+1} = a_{i,\,i+1} + b_{i,\,i+1} \cdot s_{i+1} + c_{i,\,i+1} \cdot s_{i+1}^2 : (i=1 \sim n-1)$$

Condition 2; since the first degree coefficient of the curvature is continuous at the strain gauge positions ($s_1$ to $s_n$), the following Equation 5 is given.

Equation 5

$$b_{i,\,i+1} + 2c_{i,\,i+1} \cdot s_{i+1} = b_{i+1,\,i+2} + 2c_{i+1,\,i+2} \cdot s_{i+1} : (i=1 \sim n-2)$$

Condition 3; since the unknown quantities of Equation 2 is 3n–3 and the quantities of Equations 3 to 5 is 3n–4, a strain gauge of i=1 is attached around the origin; where the origin is positioned so as to be s=0 and where a condition of a complete fixing is given, the Equation 6 is expressed as follows.

$$\left\{ \frac{dk(s)}{ds} \right\}_{s=0} = b_{1,2} = 0 \quad \text{Equation 6}$$

In accordance with the conditions described above, the unknown quantities $a_{i,\,i+1}$, $b_{i,\,i+1}$, $c_{i,\,i+1}$ in Equation 2 are determined, thereby determining the curvature distribution k(s) as a distribution formula of the curvature in the longitudinal direction. The following description is the detailed process of determination of the quantities.

The following Equation 7 is obtained from Equations 3 and 4.

Equation 7

$$c_{i,i+1} = -\frac{1}{s_i + s_{i+1}} b_{i,i+1} + \frac{k_i - k_{i+1}}{s_i^2 - s_{i+1}^2} : (i=1 \sim n-1)$$

The following Equation 8 is obtained by substituting $b_{i,\,i+1}$, $b_{i+1,\,i+2}$ of Equation 7 into Equation 5.

Equation 8

$$c_{i+1,i+2} = -\frac{s_i - s_{i+1}}{s_{i+1} - s_{i+2}} \cdot c_{i,i+1} + \frac{k_i - k_{i+1}}{(s_i - s_{i+1})(s_{i+1} - s_{i+2})}$$

$$-\frac{k_{i+1} - k_{i+2}}{(s_{i+1} - s_{i+2})^2} : (i=1 \sim n-2)$$

The following Equation 9 is obtained from Equation 7.

Equation 9

$$b_{i,i+1} = -(s_i + s_{i+1}) \cdot c_{i,i+1} + \frac{k_i - k_{i+1}}{s_i - s_{i+1}} : (i=2 \sim n-1)$$

The following Equation 10 is obtained from Equation 3.

Equation 10

$$a_{i,\,i+1} = k_i - b_{i,\,i+1} \cdot s_i - c_{i,\,i+1} \cdot s_i^2 : (i=1 \sim n-1)$$

That is, where $c_{1,2}$ is calculated from Equation 7; $c_{i+1,i+2}$ (i=1 to n–2) is from Equation 8; $b_{i,\,i+1}$ (i=2 to n–1) is from Equation 9; and $a_{i,\,i+1}$ (i=1 to n–1) is from Equation 10, the entire unknown quantities, or coefficients of Equation 2, can be determined and thereby, the curvature distribution k(s) is obtained.

Referring to FIG. 5, a computation obtaining the deformed shape using the curvature distribution k(s) thus obtained, will be described as follows.

FIG. 5 shows an X-Y coordinate system and signs for obtaining the deformed curve of the abdominal surface.

Now, the zone Di between the strain gauge positions i and i+1 is further subdivided into small sections ds. In the small section, the curvature distribution k(s) is assumed as a constant (or a part of the arc).

Where the inclination of the deformed curve is called as θs and where the increment of the same is called as Δθs, the increment Δθs can be obtained from Equation 11.

$$\Delta\theta s = -\int_s^{s+ds} k(s)dS = -[K(s) \cdot S]_s^{s+ds} = -k(s)ds \quad \text{Equation 11}$$

Since corresponding to the sign of the bending strain $\epsilon_i$ in Equation 1, the sign of k(s) becomes negative when it is convex toward the X direction and positive when it is concave. In addition, Equation 11 is satisfied in the zones $D_1, D_2, \ldots, D_{i-1}$, so that Equation 12 can provide the respective inclinations θs where Equation 11 is applied to the zones $D_1$ to $D_{i-1}$.

$$\theta s = \theta s_{=0} - \int_0^s k(s)ds \quad \text{Equation 12}$$

wherein θs=0 is the inclination at the origin.

In accordance with the geometric relation shown in FIG. 5, the increment Δx on the X-coordinate and the increment Δy on the Y-coordinate can be obtained from Equations 13, 14 using θs, Δθs.

Equation 13

$$\Delta x = \cos(\theta s + \Delta\theta s/2) \cdot ds$$

Equation 14

$$\Delta y = \sin(\theta s + \Delta\theta s/2) \cdot ds$$

The deformed shape of the strip of the stainless steel thin plate constituting the band 2 to the extent of the X-Y coordinate system can be obtained by numerical integration of Equations 13 and 14.

With the abdominal injury presumption apparatus using the bending strain measurement apparatus of the abdomen of an anthropomorphic dummy of the first preferred embodiment, when the belt 15 as an obstacle collides with the abdomen, the band 2 made of the rectangular elastic thin plate member 20 arranged in a longitudinal direction of the abdomen 10, having one end fixed to the lower end of the abdomen 10 of the dummy 1, is deformed according to deformation of the abdomen, so that by the multiple gauges 3 arranged in a longitudinal direction of the band 2, the deformation of the abdomen 10 is detected, so that based on deformation of respective portions of the band 2 detected by the gauges 3 arranged on the band 2, the deformation measuring device 4 calculates the curvature distribution of the respective portions and deformed shapes of the band 2 in the manner described above, and so that the deformation measuring device 4 measures the time history of the deformation as the time transition of the deformation.

Hereinafter, the appropriateness of the calculation results of the curvature distribution of respective portions of the band and the calculation results of deformed shapes of the band in the abdominal injury presumption apparatus using the bending strain measurement apparatus of the abdomen of an anthropomorphic dummy of the first preferred embodiment, will be described.

Figure 6:
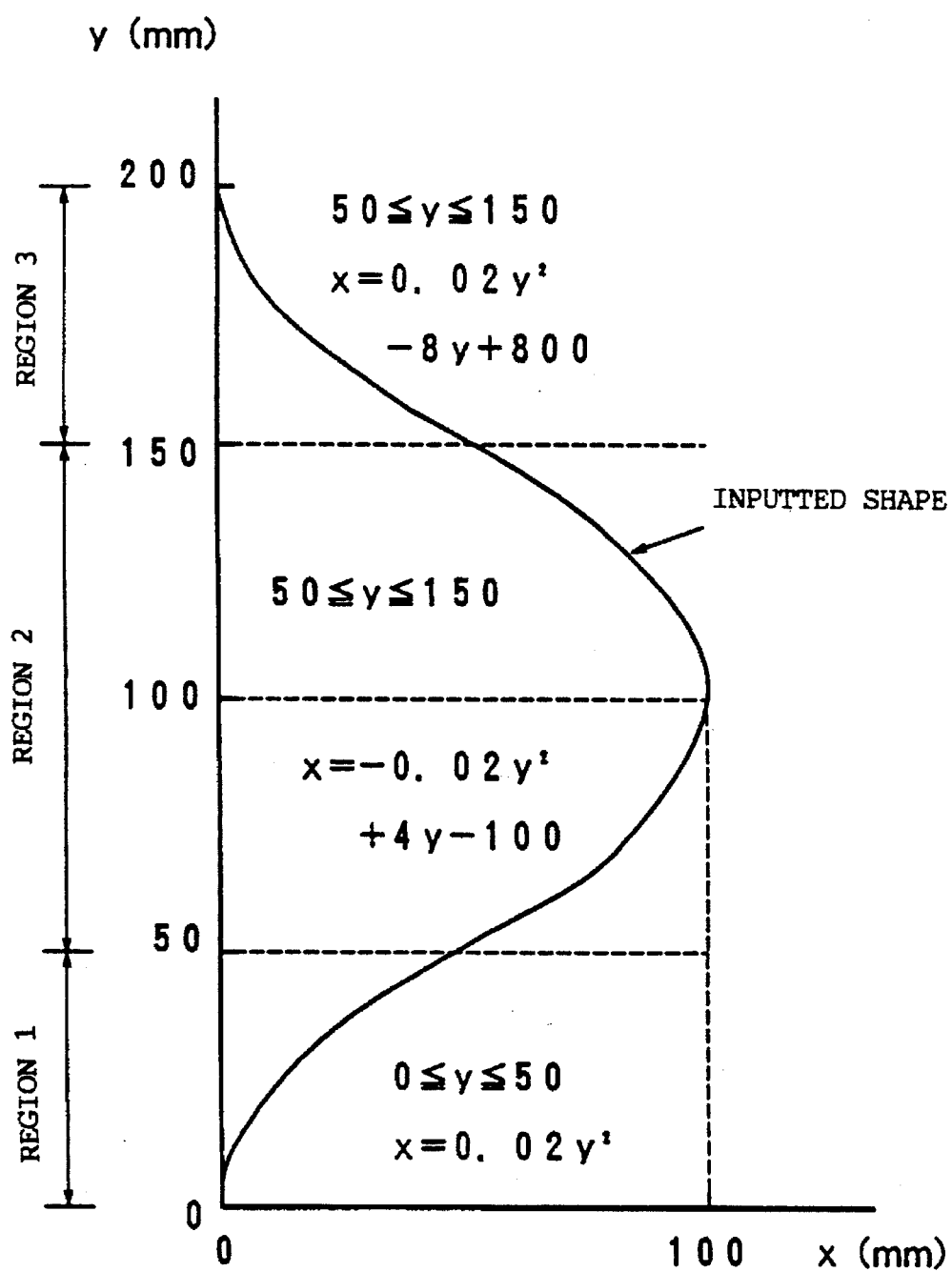
FIG. 6 is an illustration showing a deformation input shape of the band in the first embodiment.

The shape of the band 2 being inputted can be deformed as the quadratic curve as shown in FIG. 6.

Nine points (n=9) and fifteen points (n=15) as the discrete curvature are given in the longitudinal direction and are calculated according to Equations above. The total number of differential increments in the whole sections becomes 5,000. The distance between the origin and a first curvature input point can be two kinds, $s_1=2$ mm and $s_2=5$ mm.

Figure 7:
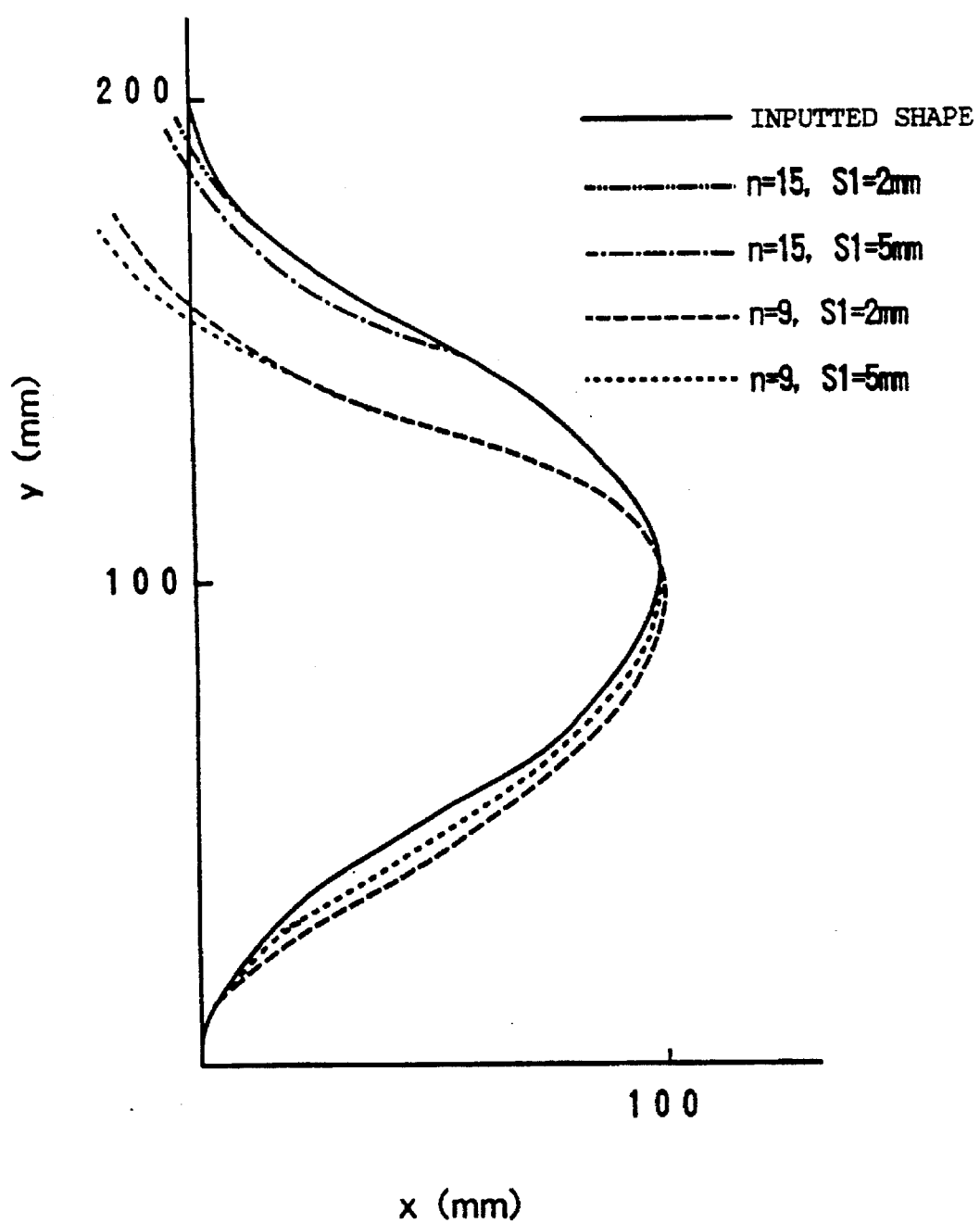
FIG. 7 is an illustration showing a deformed shape of a band as a result of operations in the first embodiment.

The calculation results are shown in FIG. 7. When n=9, the difference between the input shape shown in FIG. 6 and the calculated result is recognizable, but when n=15, the difference becomes smaller. That is, it is turned out that as the number of strain gauges for measuring the curvature increases, the calculated results become more accurate.

The distance $s_1$ from the origin to the first curvature input point is calculated more accurately as it is smaller. Accordingly, it is desirable to position the first strain gauge as much as close to the fixing point (s=0).

In an abdominal injury presumption apparatus using the bending strain measurement apparatus of the abdomen of an anthropomorphic dummy of the first preferred embodiment: the multiple gauges 3 arranged on the band 2 detect the deformation of the abdomen 10 when the belt 15 collides with the abdomen 10; the curvature distribution of the respective portions of the band 2 and the deformed shape of the band 2 are calculated; and the deformation measuring apparatus measures the deformation on the time history as a transition of the deformation of the respective portions of the band 2. With this apparatus, the deformation of the abdomen 10 of the dummy 1, as a partial deformation, is detected simultaneously and the injury of the abdomen 10 can be presumed.

The presumption apparatus of abdominal injury using a bending strain measurement apparatus for the abdomen of an anthropomorphic dummy of the first preferred embodiment has an effect to be able to measure with high accuracy where the number of the strain gauges attached on the band 2 as shown in FIG. 7 to measure the curvature is increased.

(Second Embodiment)

A presumption apparatus of abdominal injury using a bending strain measurement apparatus for the abdomen of an anthropomorphic dummy of the second preferred embodiment, as shown in FIGS. 8 to 12, is constituted of: a band 2, constituted of a rectangular elastic thin plate member 21 extended so as to be U-shaped and held by a guide member 22 made of a low friction material and arranged in a longitudinal direction of the abdomen 10, on which multiple gauges 31 for detecting deformation of the abdomen 10 when an impacting member 16 or else serving as an obstacle collides with the abdomen 10 are arranged in a longitudinal direction; a deformation measuring device 4 for measuring a time history of the deformation, based on the deformation of the respective portions of the band 2 detected by the gauges 31 as a time transition of the deformation of the respective portions of the band 2; a deformational velocity measuring device 5 for measuring a time history of the deformational velocity, based on the deformation of the respective portions of the band 2 detected by the gauges 31 as a transition of the deformational velocity of the respective portions of the band 2; an injury presumption device 6 for presuming abdominal injuries based on the measured deformation and deformational velocity on the time basis.

Figure 8:
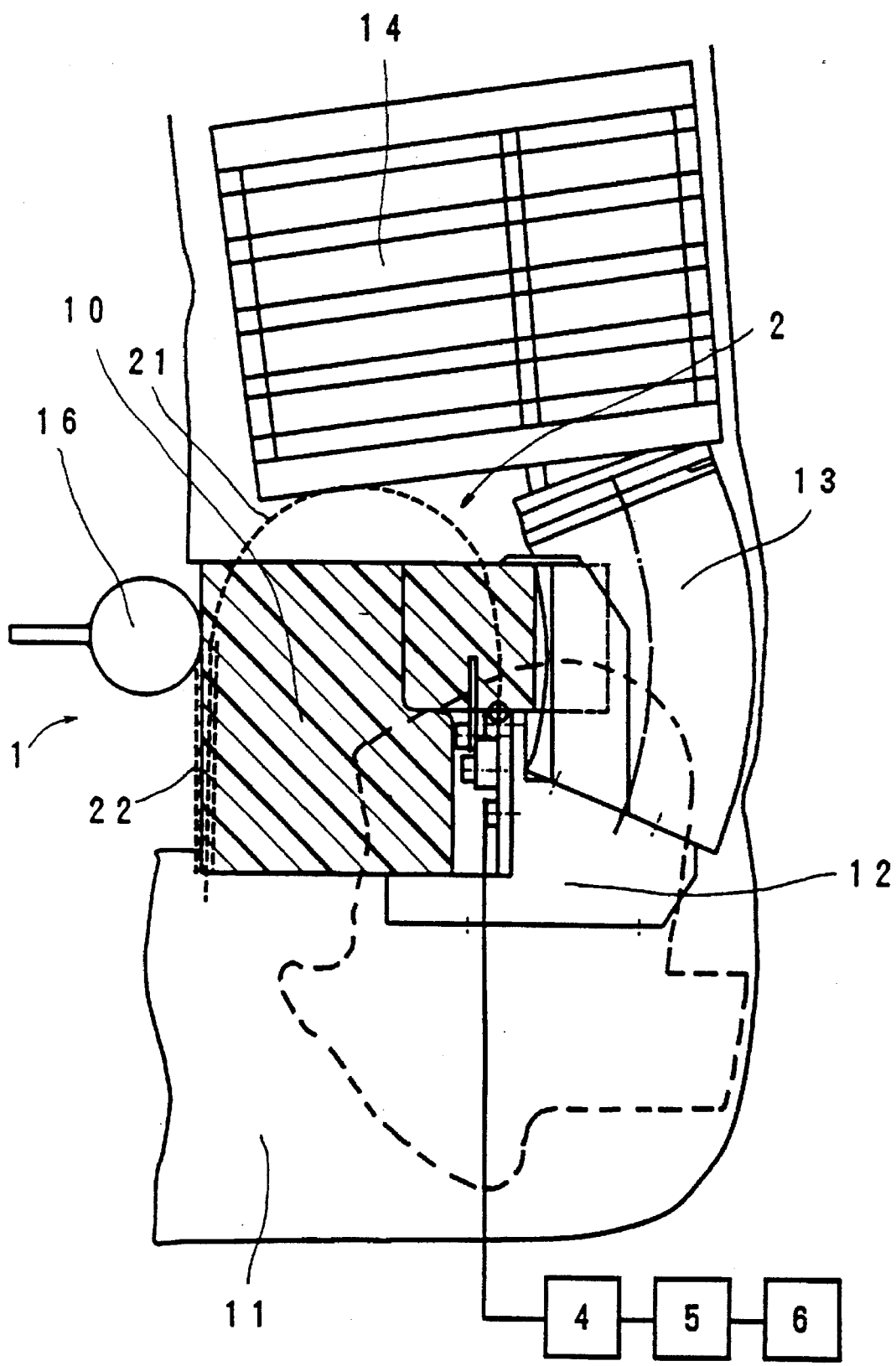
FIG. 8 is a cross-sectional view showing an apparatus of the second embodiment according to the present invention.
Figure 9:
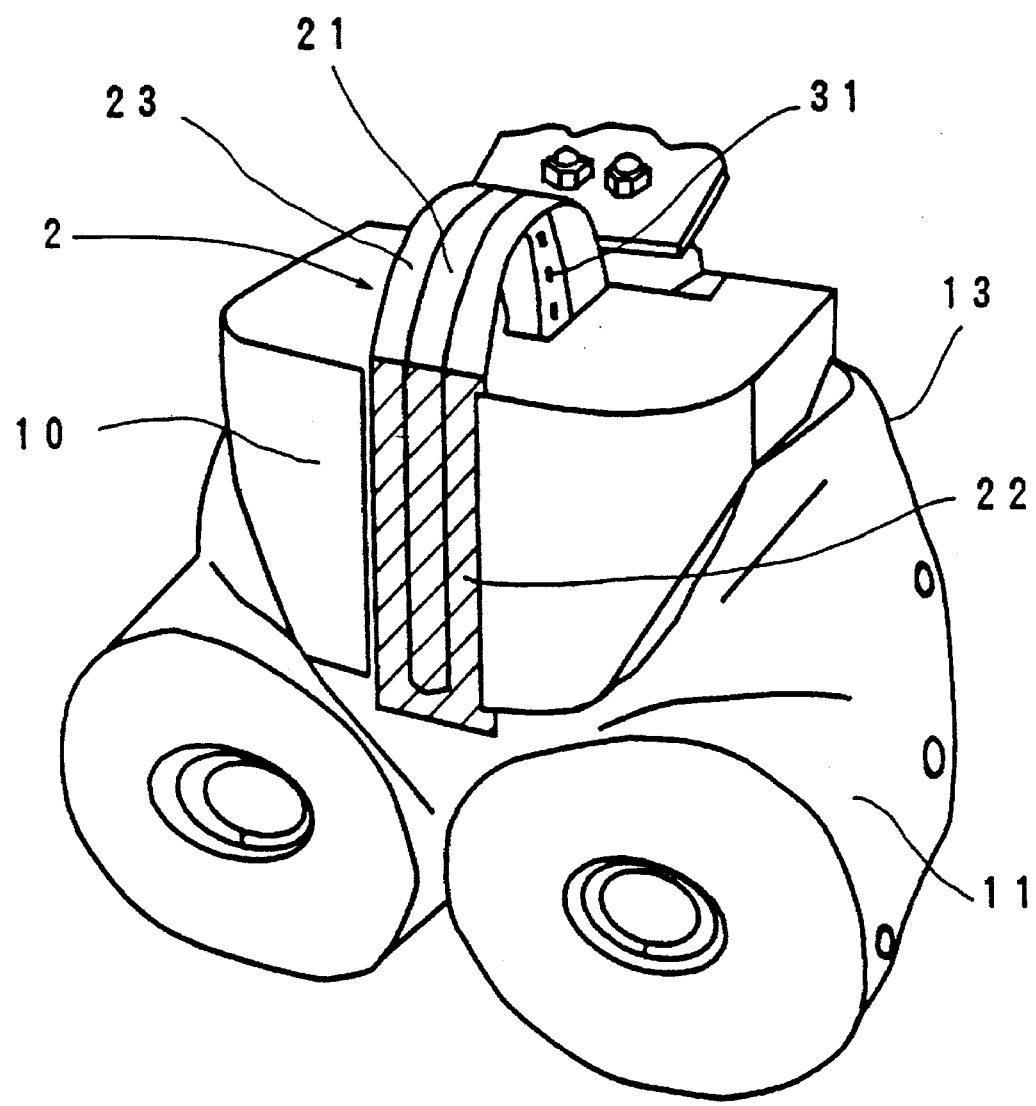
FIG. 9 is a perspective view showing the apparatus of the second embodiment.

FIGS. 8 and 9 show that the dummy 1 is formed with a pelvis 12 arranged on legs 11 placed at the lowest position, the abdomen 10 placed in front of a spinal column 13 constituting a waist being arranged on the pelvis 12 and made of foam rubber, as like Neoprene 15 (trademark) shown in Table 1, and a thorax 14 placed over the abdomen 10.

TABLE 1

HARDNESS IN SPRING TYPE TESTER AND APPARENT SPECIFIC GRAVITY IN ABDOMEN MATERIAL

| SIGN | NAME | CHEMICHAL STRUCTURE | HARDNESS IN SPRING TYPE TESTER (degree) | APPARENT SPECIFIC GRAVITY (gf/cm$^3$) |
|---|---|---|---|---|
| A | NEOPRENE 30 | POLYCHLORO-PRENE | 30–34 | 0.23 |
| B | NEOPRENE 15 | | 14–18 | 0.20 |
| C | EPT 25 | ETHYLENE-PROPYLENE-TARPOLYMER | 18–22 | 0.17 |
| D | EPT 15 | | 5–6 | 0.15 |

The abdomen 10 was fabricated after six sheets of Neoprene 15 of 30 mm in thickness were stacked. A fabric for automobile seats is clamped between the second and third sheets from the front end of the abdomen to prevent the abdomen from rotating during receiving an impact; the lower end of the fabric is clamped by two sheets of aluminum alloy plate of 20 mm in length, 78 mm in width, and 3 mm in thickness with bolts and is fixed to the front end of a spine fixing block with two bolts.

The band 2 comprises the rectangular elastic thin plate member 21 which is, as shown in FIGS. 8 and 9, constituted of a strip-shaped stainless steel thin plate (SUS 301) of 380 mm in length, 12.7 mm in width, and 0.1 mm in thickness, which is selected from thickness tapes, fixed to a fixing portion in front of a lower spine with two bolts at a chamfered lower fixing end thereof, and disposed so as to extend U-shapely from the backside to the front abdomen side.

Although steel (SUS 301 Cold Working Material) is used in this embodiment, this can be another metal thin plate having good spring characteristics except the steel or a non-metal material having good spring characteristics, such as a plastic thin plate. Here, "good spring characteristics" means that a proportional limitation against the strain or elastic limitation in the material is great.

Figure 10:
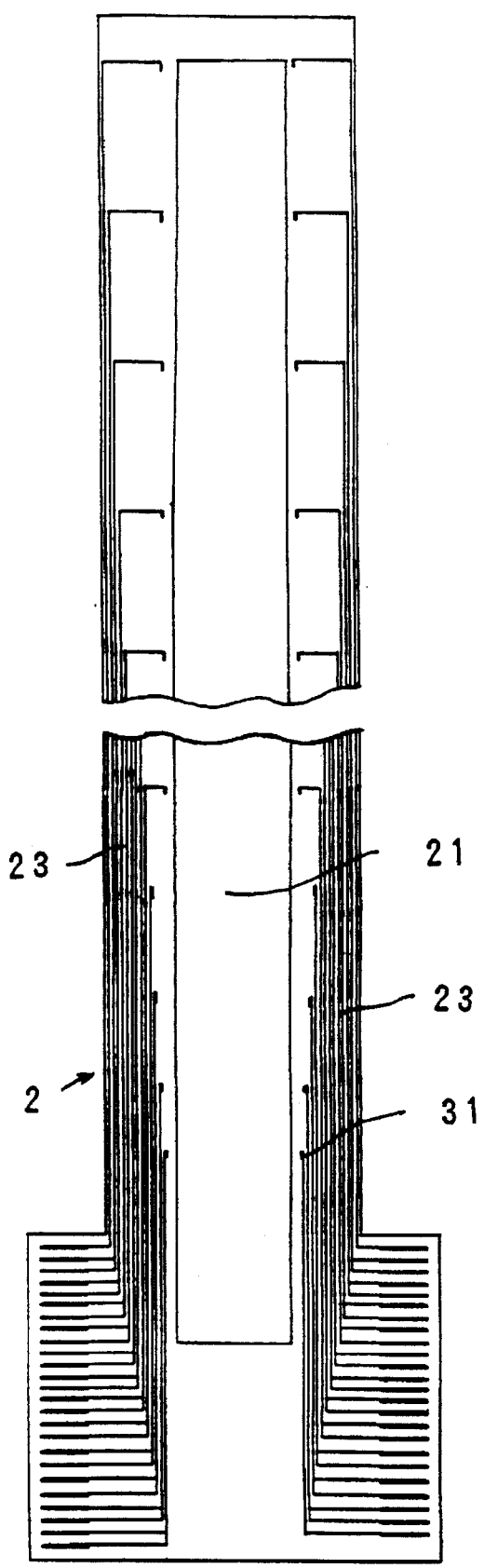
FIG. 10 is a front view showing the apparatus of the second embodiment.
Figure 11:
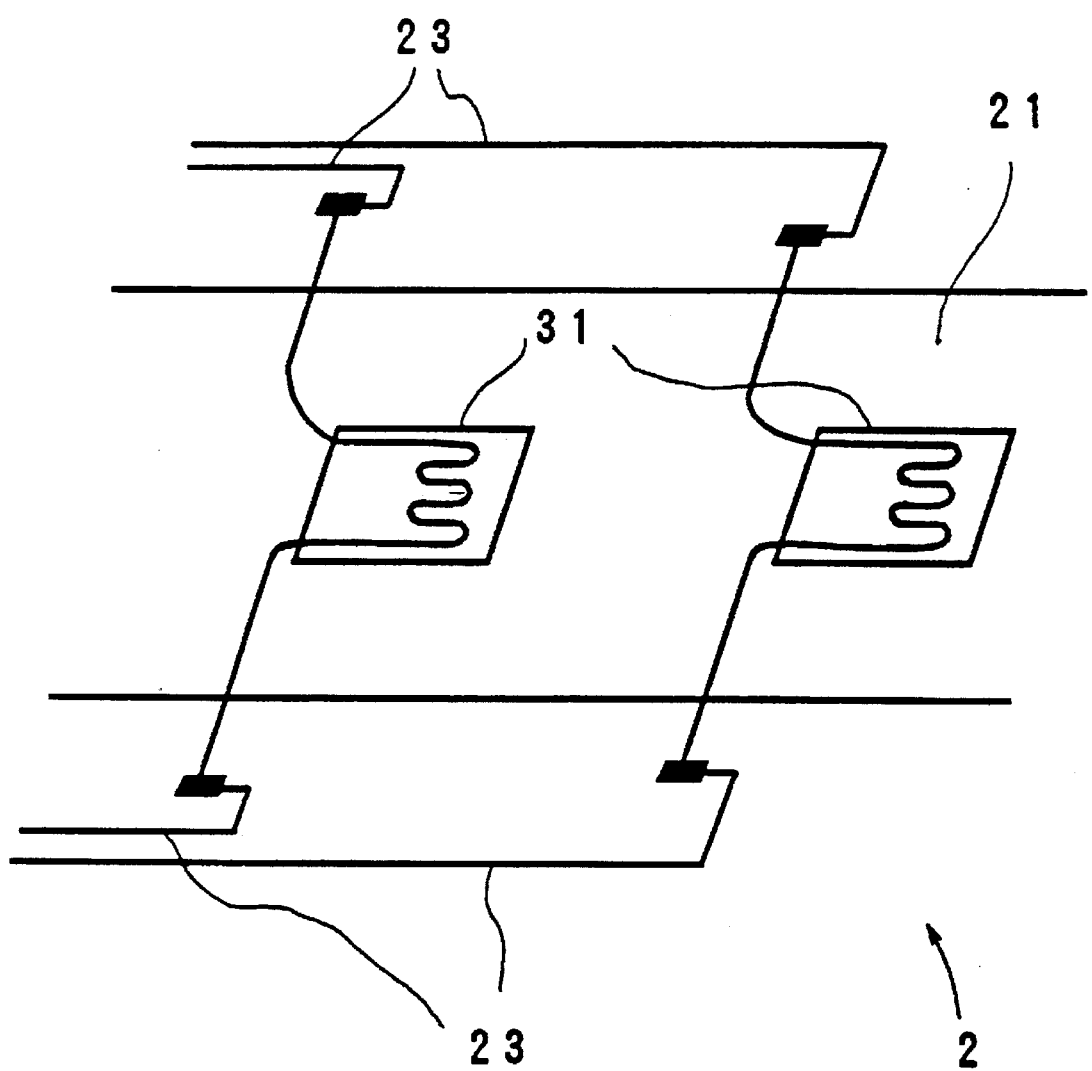
FIG. 11 is a perspective view showing gauges and lead portions of the second embodiment.

The gauge 31 is constituted of a foil type single-axis gauge of 1 mm in length and 0.04 mm in thickness, and as shown in FIGS. 10 and 11, the twenty five gauges 31 are attached onto the rectangular elastic thin plate member 21 in the longitudinal direction with variable strain gauge intervals of 12 to 18 mm, which intervals become narrow at a zone of larger deformation and become wide at a zone of smaller deformation.

A flexible printed circuit provided in parallel to and corresponding to the strain gauges attached in the longitudinal direction of the rectangular elastic thin plate member 21 shown in FIG. 10, designed so that the resistances of the lead wires of the twenty five strain gauges become the same and so that the rigidity against bending becomes constant in the longitudinal direction, forms a lead portion 23.

The strain gauges serving as sensors can be constituted of a foil piece of single semiconductor crystal attached onto a surface of a steel strip by insulating adhesive, or be formed by a thin film of semiconductor or conductor made by evaporating, sputtering, or etching after an insulating layer is formed on the steel strip surface. The strain gauge works, at least with changes of resistance; in this embodiment, it was constituted by making a foil gauge adhere.

Figure 12:
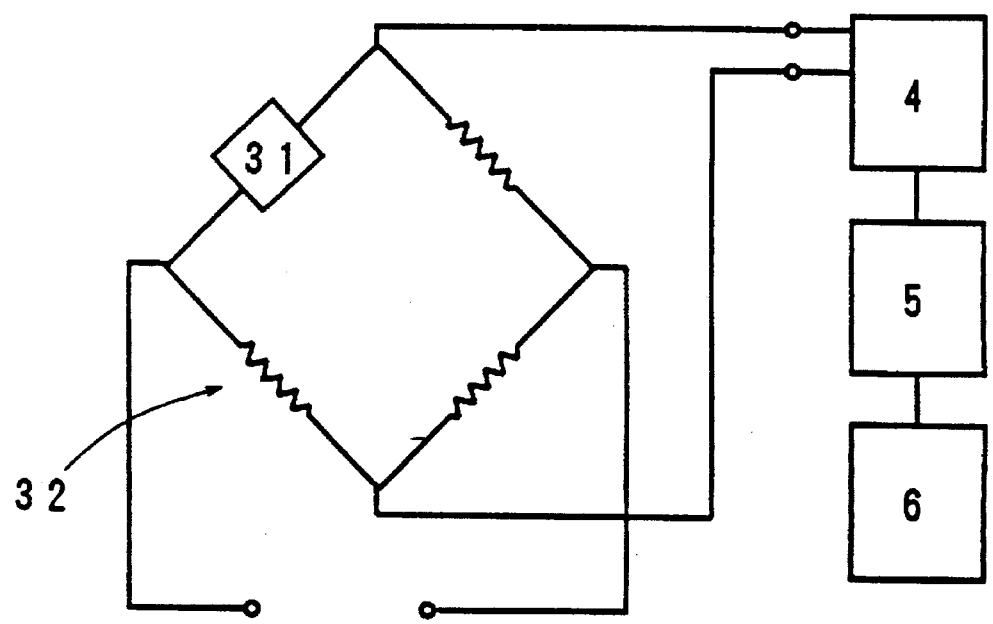
FIG. 12 is a block diagram showing a bridge circuit constituted of the gauges of the second embodiment.

The gauge 31 constitutes, as shown in FIG. 12, a bridge circuit 32 through lead wires, and active gauges constitute one gauge method of one set of the Wheat stone Bridge.

The rectangular elastic thin plate member 21 and the lead portion, as shown in FIGS. 8 and 9, is enclosed in a Teflon sheet of 0.13 mm in thickness constituting a friction reducing member and is inserted in a guide member 22 constituted of a Teflon-made sheath of 0.08 mm in thickness attached to the front surface of the abdomen by a double-side adhesive tape.

The deformation and deformational velocity measuring device 5 is constituted to calculate the curvature distribution and the deformed shape of the band 2 based on the bending strain of the respective portions of the band 2 detected by the gauges 31 arranged on the band 2 when the impacting member 16 collided, to obtain transitions of the deformations of the respective portions of the band, and thereby to be able to measure and calculate the deformation on the time basis.

The deformation and deformational velocity measuring device 5 is constituted to obtain a time transition of the maximum deformation point within a zone at which the obstacle collided with the abdomen based on the bending strain of the portion of the band 2 detected by the gauges 3, to calculate the time differential of the amount of the deformation of the maximum deformation point, and thereby to be able to measure time histories of the deformation and the deformational velocity as the time transitions of the deformation and the deformational velocity of the respective portions of the band 2.

The injury presumption device 6 is constituted to calculate the maximum value Cm of the time histories of the deformation C and the maximum value VCm of a product of the deformation C and the deformational velocity V, based on the time histories of the measured deformation C and deformational velocity V, to perform calculations to compare the calculated maximum values with an abdominal injury degree presumption reference, and thereby to be able to presume abdominal injuries.

With the presumption apparatus of abdominal injury using a bending strain measurement apparatus for the abdomen of an anthropomorphic dummy of the second preferred embodiment thus constituted, when the impacting member 16 as an obstacle collides with the abdomen 10, the band 2, comprising the rectangular elastic thin plate member 21 arranged from the center of the abdomen 10 in the longitudinal direction of the front surface of the abdomen 10, having one end fixed at the center lower end of the abdomen 10 of the dummy 1, is deformed according to the deformation of the abdomen 10. Then by the multiple gauges 31 arranged in a longitudinal direction of the band 2, the deformation of the abdomen 10 is detected; based on bending strain of the respective portions of the band 2 detected by the gauges 31 arranged on the band 2, the deformation measuring device 4 calculates the curvature distribution of the respective portions of the band 2 and deformed shapes of the band 2 in the manner described above; the deformation measuring device 4 measures the deformation on the time basis as a time transition of the deformation; the deformational velocity device 5 measures the deformational velocity of the respective portions of the band 2 on the time basis; and the injury presumption device 6 presumes abdominal injuries based on the deformation and deformational velocity on the time basis.

To make sure the effectiveness of the presumption apparatus of abdominal injury using a bending strain measurement apparatus for the abdomen of an anthropomorphic dummy of the second preferred embodiment and the dummy abdominal members, a pedestrian protection tester having a holder for fixing an impacting member, discharging the impacting member together with the holder in a horizontal direction or in a vertically downward direction with high speed, and having a function capable of colliding the member with a high speed to the dummy's abdomen set on a stable board, was used to conduct an impact shock test.

The impacting member 16 was a cylindrical bar whose diameter was 50 mm, whose mass including the holder was 20 kg, and whose impacting speed was 3.01 meter per second; the deformation of the abdomen 10 of the dummy 1 was measured and analyzed by the dummy's abdominal deformation measurement apparatus of the second preferred embodiment and a high speed photography.

In the test, the target position of the impacting member is located 31 mm below the top of the abdomen 10 and is equivalent to a position of 101 mm above the top of the lumbar-spine bracket.

With the test results, in FIG. 13, the solid line is a measured result using the presumption apparatus of abdominal injury using a bending strain measurement apparatus for the abdomen of an anthropomorphic dummy and the dummy abdominal member according to the second preferred embodiment; the broken line is an analyzed result of the high speed photography; both show respective deformation modes at 0 (at the collision time), 10, 20, 30, and 40 milliseconds later from the collision of the impacting member 16 and have good similarity in the shapes at a time that the apparatus is attached to the abdomen and in the deformation modes of the abdomen 10 during the collision. The difference between them with respect to an impacting member's intrusion amount of about 96 mm at the time of 40 milliseconds was 7 percent.

When the maximum value VCm of a viscous criterion VC is calculated based on a body thickness (206 mm) of the apparatus of the second preferred embodiment, the measured value by the apparatus of the second preferred embodiment was 0.7 meter per second, whereas the value by the high speed photography was 0.8 meter per second.

Where a lap belt whose width was 48 mm was attached through a jig to the tip of the pedestrian protection tester and where the abdomen 10 of the apparatus of the second preferred embodiment is disposed horizontally, an impact from an upper side is applied with the lap belt. The impacting mass was 21.1 kg; the impacting speed was 2.91 meter per second and 5.15 meter per second; the position from which the impact is applied is at 89 mm over the top of the lumbar-spine bracket.

Figure 15:
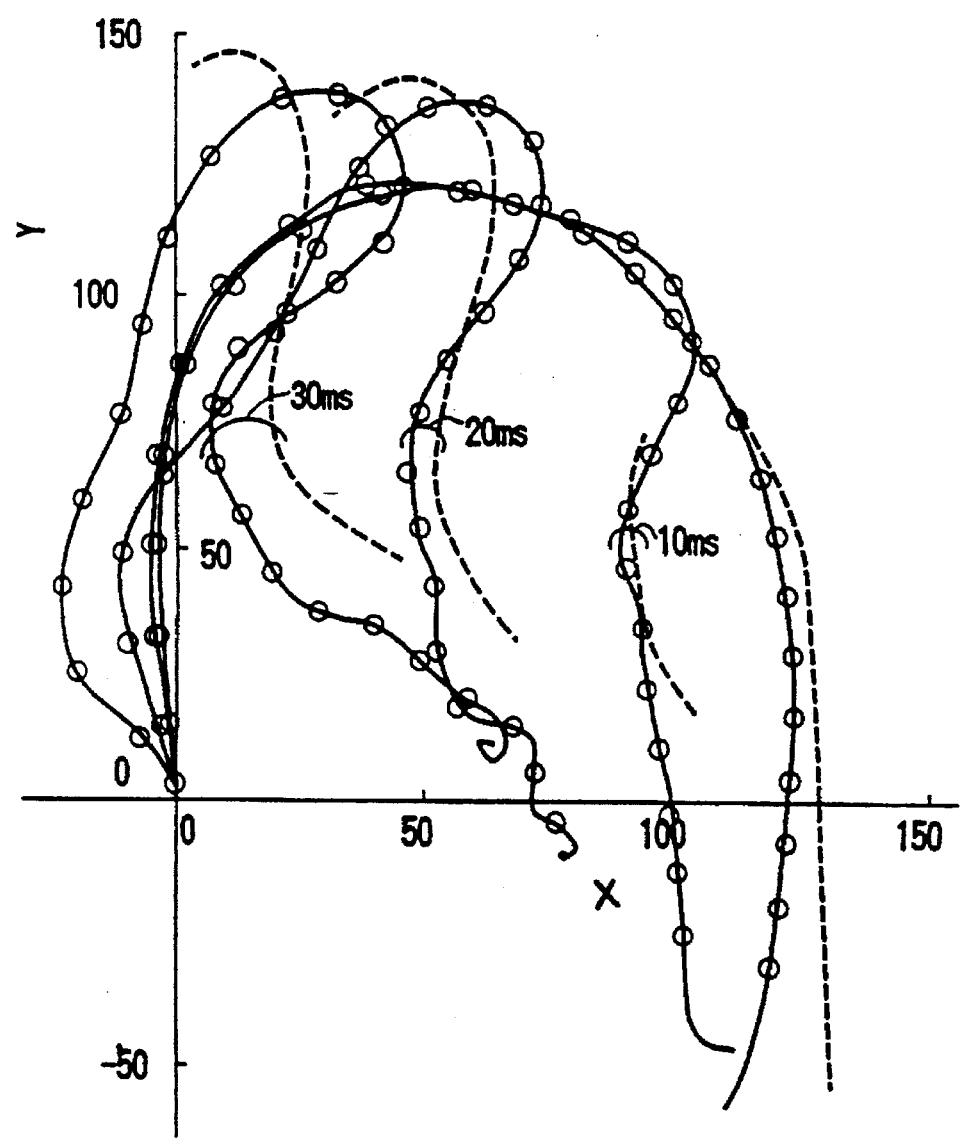
FIG. 15 is an illustration showing transitions of deformation of the bend of the second embodiment at impact speed of 5.15 meter per second with a lap belt.
Figure 16A:
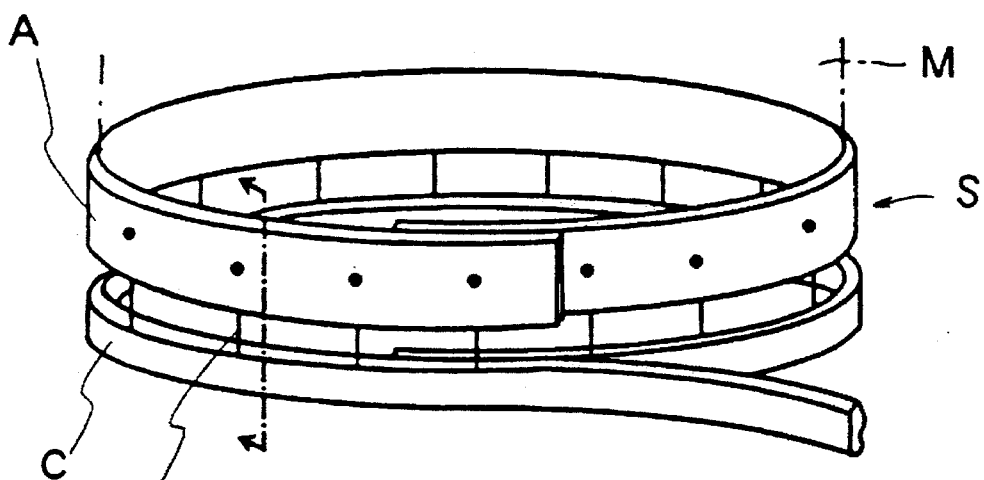
FIGS. 16a and 16b are descriptive diagrams showing a steel band and a bridge circuit of a first conventional apparatus.
Figure 16B:
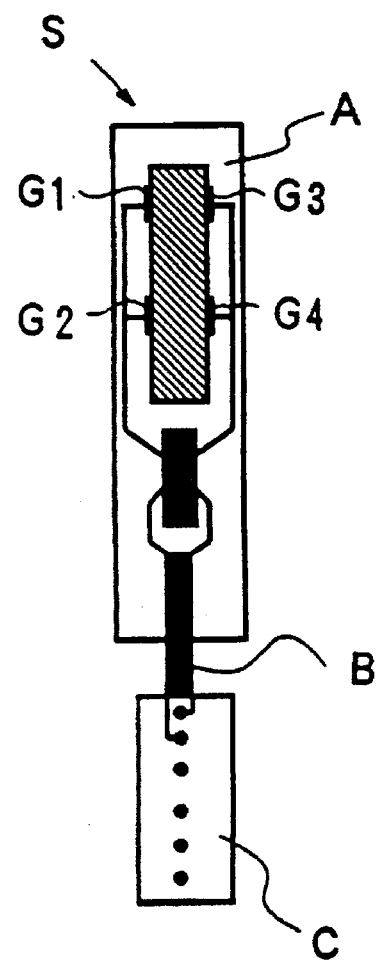
Figure 17A:
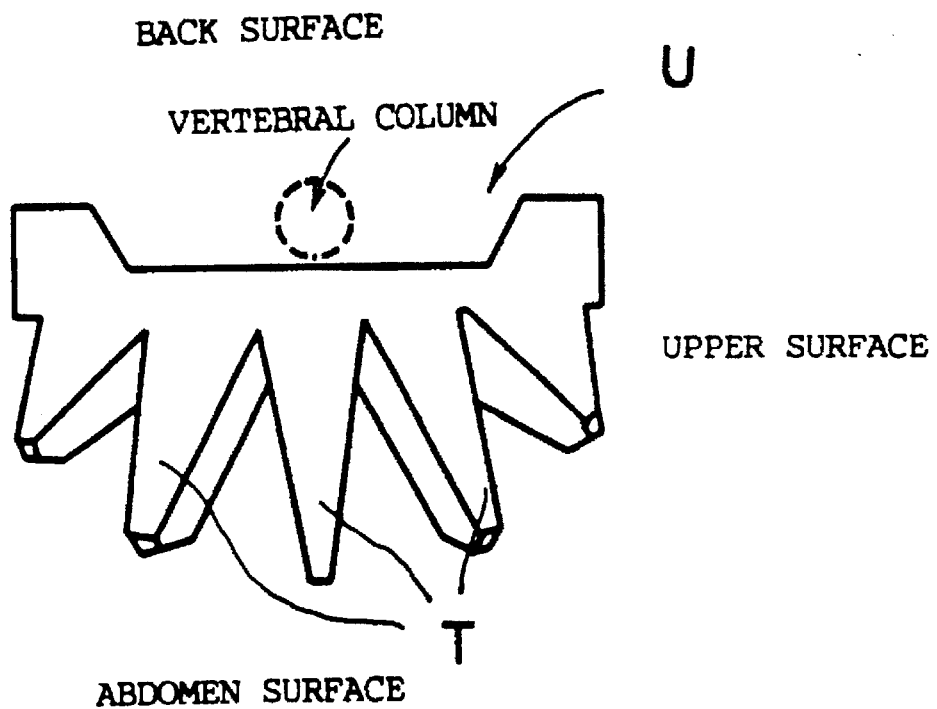
FIGS. 17a and 17b are descriptive diagrams showing a second conventional apparatus.
Figure 17B:
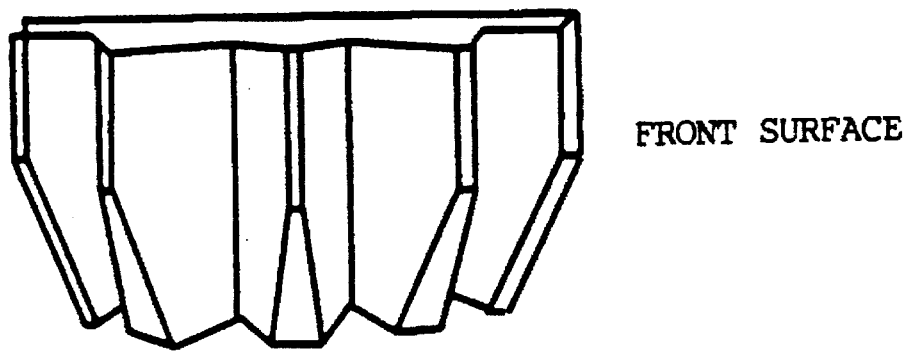

The result at the impacting speed of 2.91 meter per second is shown in FIG. 14; the result at the impacting speed of 5.15 meter per second is shown in FIG. 15; in the figures, the solid lines are measured results by the dummy's abdominal deformation measurement apparatus of the second preferred embodiment, and the broken lines are analyzed results by the high speed photography; although the abdominal shapes with the apparatus of the second preferred embodiment can be recognized with a slight difference between them with respect to time t=0, the deformation modes during the collision correspond well between them and clearly shows a state that the lap belt was moved up during the collision.

When the impacting speed was 2.91 meter per second, the maximum deformation was, at the time of 50 millisecond later, 87 mm in terms of the measured value obtained by the apparatus of the second preferred embodiment and 89 mm in terms of the analyzed value obtained by the high speed photography. That means the error was only 2 percent. When the impacting speed was 5.15 meter per second, there were much difference between them at the time of 30 millisecond later. This is presumably due to measurement errors caused by lap belt's reaching to the bottom, which may cause plastic deformation of the rectangular elastic thin plate member 21.

Figure 13:
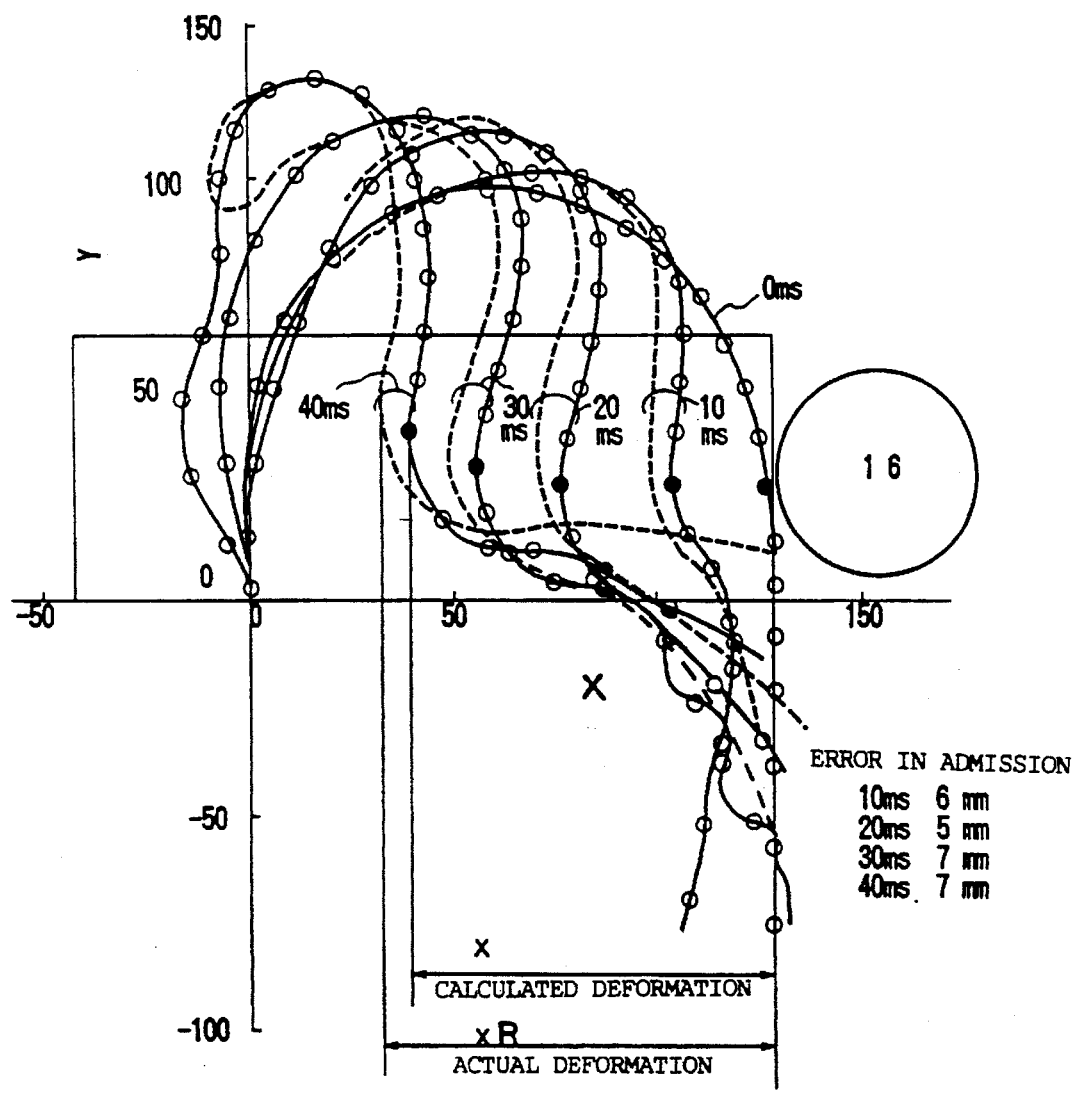
FIG. 13 is an illustration showing transitions of deformation of the band of the second embodiment.

In the dummy's abdominal deformation measurement apparatus of the second preferred embodiment: the deformation of the abdomen 10 when the impacting member 16 and the belt 15 collide with the abdomen 10 is detected by the multiple gauges 31 arranged on the band 2; the curvature distribution of the respective portions of the band 2 and the deformed shape of the band 2 are calculated; and the deformation measuring device 4 as shown in FIGS. 13 to 15 measures the time history of the deformation as a time transition of the deformation of the respective portions of the band. The apparatus has an effect that the deformation of the abdomen 10 of the dummy 1 as a partial deformation is detected.

The presumption apparatus of abdominal injury using a bending strain measurement apparatus for the abdomen of an anthropomorphic dummy of the second preferred embodiment has an effect that the abdominal injuries are identified since the deformational velocity measuring device 5 measures the time history of the deformational velocity of the respective portions of the band 2 and since the injury presumption device 6 presumes the abdominal injuries based on the time histories of the deformation and the deformational velocity.

The presumption apparatus of abdominal injury using a bending strain measurement apparatus for the abdomen of an anthropomorphic dummy of the second preferred embodiment has an effect to reduce rigidity against bending and thereby to make it easier to be deformed because the rectangular elastic thin plate member 21 constituting the band 2 serving as sensors is constituted of a stainless steel thin strip as well as the lead portion is constituted of the flexible printed circuit and has an effect to make accurately measurable the deformed shape of the abdomen because axial strain never occurs during the deformation.

The apparatus of the second preferred embodiment makes the rectangular elastic thin plate member 21 move easily even when locally large deformation occurs at the abdomen at the time of the collision and has an effect to prevent the rectangular elastic thin plate member 21 from sustaining tensional strain or being folded around the chamfered fixing portion, because the rectangular elastic thin plate member 21 constituting the band 2 is arranged so as to extend U-shapely from the rear side to the front side of the abdomen 10.

The apparatus of the second preferred embodiment has an effect to reduce its rigidity against bending and attenuation force and to improve its response, because the rectangular elastic thin plate member 21 constituting the band 2 is constituted of a stainless steel thin strip as well as the lead portion is constituted of the flexible printed circuit.

Because the rectangular elastic thin plate member 21 and the lead portion are enclosed by the Teflon sheet constituting the friction reduction member and are inserted in the guide member 22 constituted of the sheath made of Teflon attached onto the front surface of the abdomen 10, the apparatus of the second preferred embodiment makes the motion of the rectangular elastic thin plate member 21 smooth, thereby preventing the occurrence of the tensional strain in the rectangular elastic thin plate member 21, and having an effect to enable itself to accurately measure the deformed shape of the abdomen.

The apparatus of the second preferred embodiment has an effect to be able to measure with high accuracy because twenty five of the strain gauges for measuring the curvature are attached onto the band 2.

The apparatus of the second preferred embodiment has an effect to be able to accurately grasp the abdominal injuries because the abdomen 10 is constituted of a chloroprene rubber foam material Neoprene 15 (trademark) as a material matching the response characteristics of human body's abdomen at the impacting speed of 6 meters per second.

As examples for abdominal materials, Table 1 shows chemical structures of four types materials of which load-bending characteristics are researched. In Table 1, spring hardness (degree) and apparent specific gravity(gf/cm$^3$) are given respectively. The spring hardness and the apparent specific gravity are shown by values obtained according to Standard No. SRIS 0101 of the Society of Rubber Industry, Japan.

With respect to the four types of abdominal materials, shown in Table 1, in which an abdominal material (175 mm in length, 300 mm in width, and 150 mm in thickness) stacking five sheets of 30 mm in thickness is fixed to a fixing wall on a plane, the load-bending response curve when an impacting member using a cylindrical bar of 25 mm in diameter collides at the impacting mass of 20 kg and at the impacting speed of 6 meter per second is obtained and shown in FIG. 18.

Figure 19:
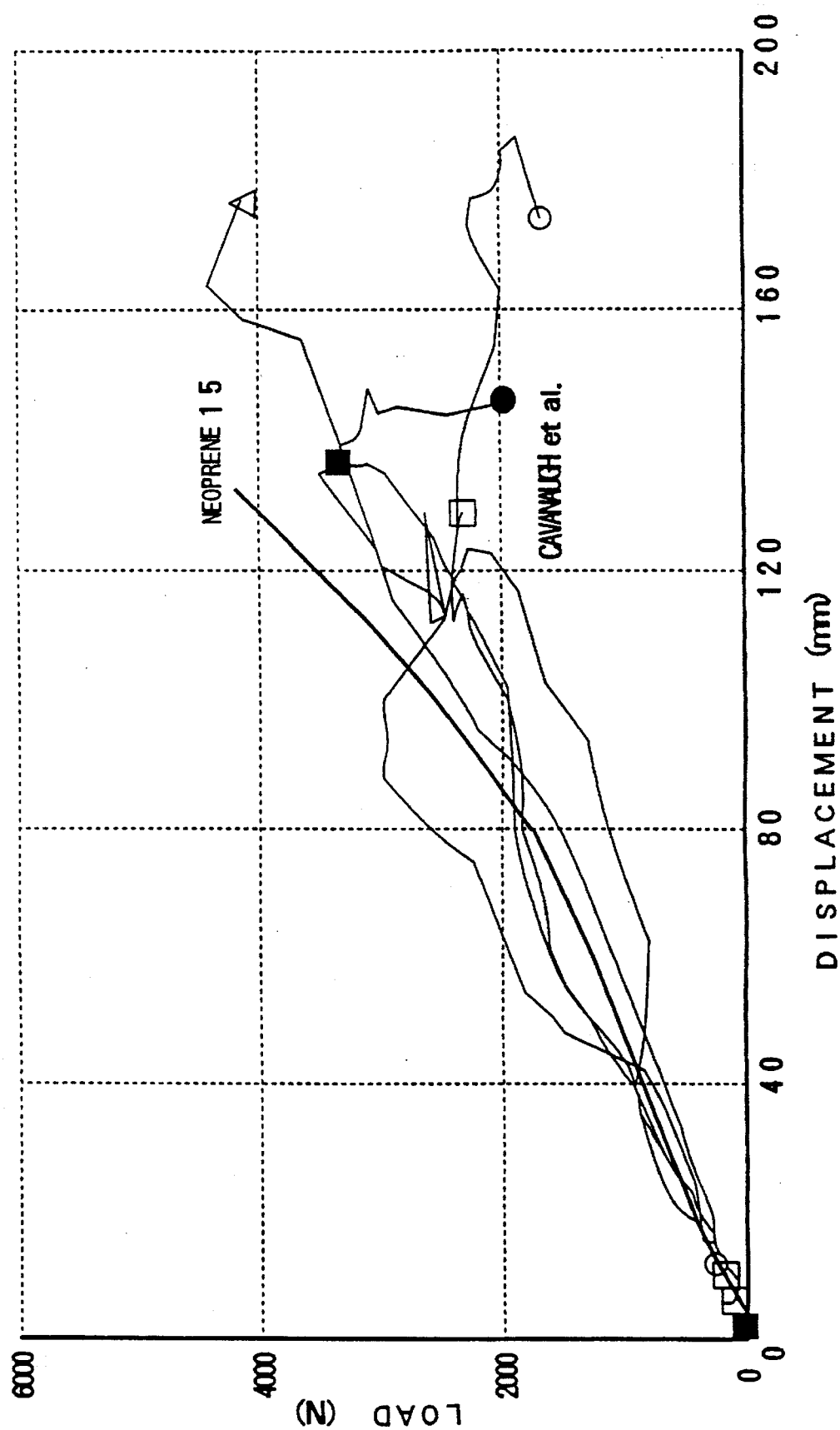
FIG. 19 is a diagram showing load-deflection characteristics of the abdominal material above (Neoprene 15) and an abdominal material at Cavanaugh's.
Figure 20:
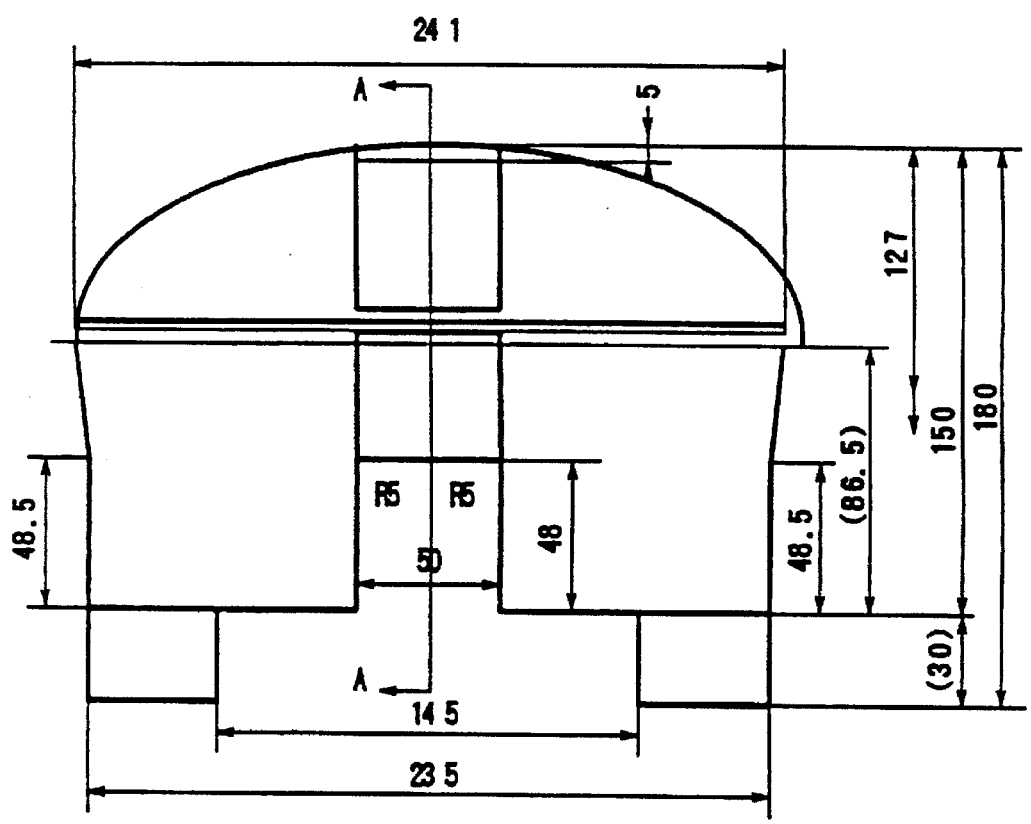
FIG. 20 is a plain view showing another example of the abdomen in which sheets are made to be multilayered and mechanically fabricated.
Figure 21:
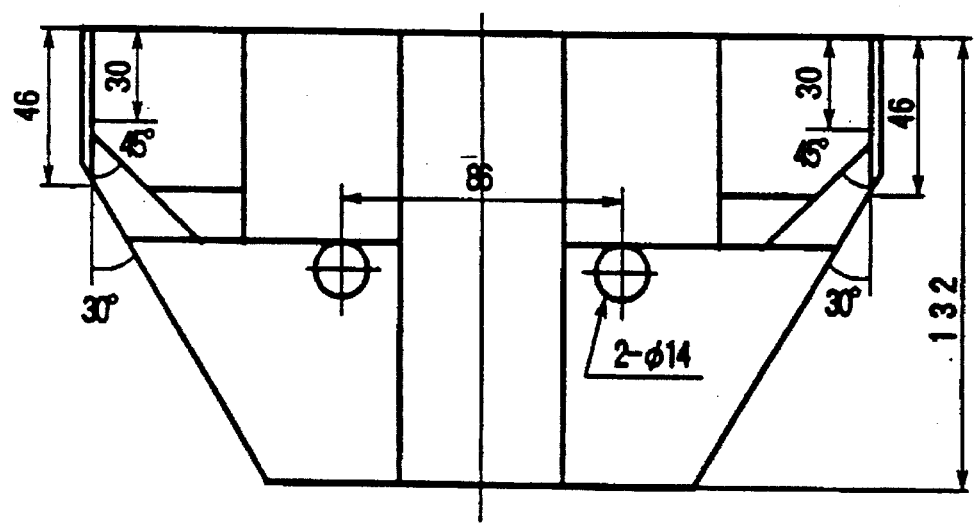
FIG. 21 is a rear view showing a rear side of the abdomen.
Figure 22:
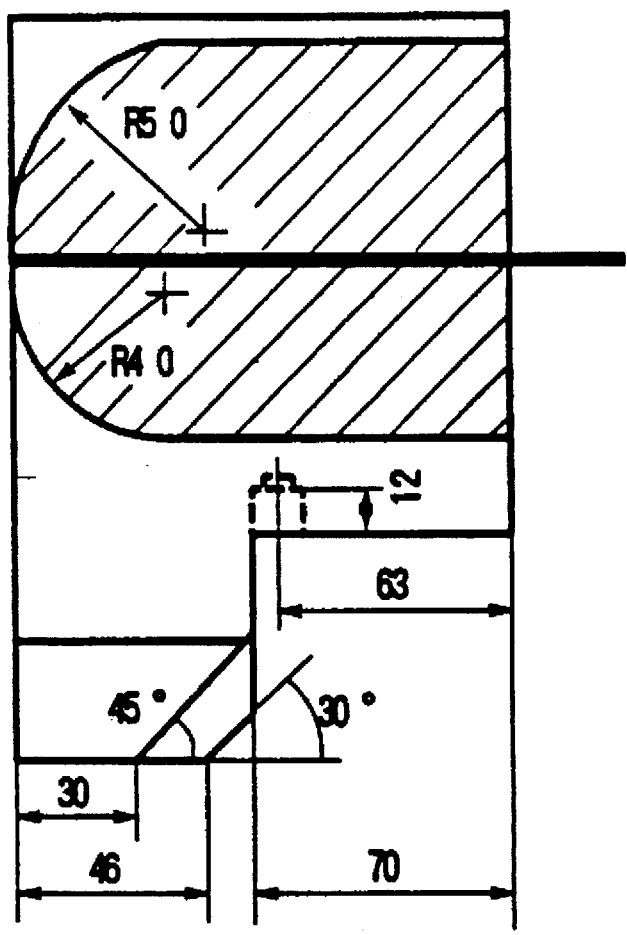
FIG. 22 is a cross-sectional view showing a cross section of the abdomen, taken along A—A line in FIG. 20.

The load-bending response curve at a time of the collision under the same condition of the impacting member, the impacting mass, and the impacting speed as those in FIG. 18 where sheets of 30 mm in thickness of a chloroprene rubber foam material (Neoprene 15 shown in FIG. 18) are stacked, fabricated into one having a shape shown in FIGS. 20 to 22, and supported by a receiving surface integrally formed on the pelvis 12 of the dummy, is obtained and shown in FIG. 19.

For the purpose of comparison, in FIG. 19, the load-bending characteristics, presented by Cavanaugh et al. at the SEA (SEA 861878, 1986), which was obtained by using a non-antiseptic dead body and an impacting member which is a cylindrical bar of 25 mm in diameter under the condition of the impacting speed of 6.1 meters per second and of the impacting mass of 31.4 kg, are shown together. According to FIG. 19, it turns out that Neoprene 15's characteristics is well coincided with the results of Cavanaugh's.

According to FIG. 18, it turns out that EPT25'S characteristic is equivalent with the Neoprene 15's characteristic.

The preferred embodiments described above are illustrated for explanation, and it is to be understood that the present invention should not be limited to those embodiments. Any modifications and additions are possible so long as the claims, the detailed description of the invention and the description of the drawings are not opposed to the technical concept of the invention appreciated by the same skilled persons.

What is claimed is:

1. A bending strain measurement apparatus for an abdomen of an anthropomorphic dummy comprising:

a band constituted of an elastic thin plate member and arranged in a longitudinal direction of said abdomen, said band having one end thereof fixed in a vicinity of said abdomen of said dummy and a plurality of gauges arranged on said band in a longitudinal direction thereof for detecting a bending strain of said abdomen when an obstacle collides with said abdomen; and a measuring device for measuring a time history of the bending strain based on a bending strain of respective portions of said band detected by said gauges arranged on said band as a time transition of the bending strain of the respective portions of the band.

2. A bending strain measurement apparatus according to claim 1, wherein:

said one end of said band is fixed to a member on which said abdomen is arranged.

3. A bending strain measurement apparatus according to claim 1, wherein:

said measuring device comprises means for measuring the time history of the bending strain for calculating a curvature distribution and a deformed shape of said band when an obstacle collides with said abdomen.

4. An abdominal injury presumption apparatus for an abdomen of an anthropomorphic dummy comprising:

a band constituted of an elastic thin plate member, arranged in a longitudinal direction of said abdomen, having one end thereof fixed in a vicinity of said abdomen of said dummy and a plurality of gauges arranged on said band in a longitudinal direction thereof for detecting a bending strain of said abdomen when an obstacle collides with said abdomen;

a measuring device for measuring time history of the bending strain based on a bending strain of respective portions of said band detected by said gauges arranged on said band as a time transition of the bending strain of the respective portions of the band;

a deformation and deformational velocity measurement device for measuring time histories of deformation and deformational velocity of the respective portions of said band, based on bending strain of said respective portions of said band detected by said gauges; and an injury presumption device for presuming abdominal injuries based on the time histories of the deformation and deformational velocity.

5. An abdominal injury presumption apparatus according to claim 4, wherein:

said measuring device comprises means for measuring the time history of the bending strain for calculating a curvature distribution and a deformed shape of said band when an obstacle collides with said abdomen, and means for obtaining a time transition of a maximum deformation point within a zone at which said obstacle collides with said abdomen and for differentiating an amount of the deformation at the maximum deformation point with respect to time.

6. An abdominal injury presumption apparatus according to claim 5, wherein:

said injury presumption device comprises means for calculating a maximum value of the measured time history of the deformation of said band and a maximum value of the measured time history of a product of the deformation and the deformational velocity and means for comparing the calculated maximum values with an abdominal injury degree presumption reference.

7. A bending strain measurement apparatus according to claim 1, further comprising:

a guide member for supporting said band, arranged along a front surface of said abdomen and into which said elastic thin plate member is inserted.

8. A bending strain measurement apparatus according to claim 7, further comprising:

a friction reduction member for reducing friction on contacting surfaces between said guide member and said elastic thin plate member of said band.

9. A bending strain measurement apparatus according to claim 8, wherein:

said guide member is made of a low friction material.

10. A bending strain measurement apparatus according to claim 8, wherein:

said friction reduction member is interposed between said band and said guide member.

11. A bending strain measurement apparatus according to claim 10, wherein:

said band is covered with said friction reduction member.

12. A bending strain measurement apparatus according to claim 1, wherein:

said dummy comprises: a pelvis arranged on legs placed at a lowest position of the dummy; said abdomen placed in front of a spinal column, arranged on said pelvis and made of foam material; and a thorax placed over said abdomen.

13. A bending strain measurement apparatus according to claim 12, wherein:

said abdomen is made of Neoprene 15 or EPT 25.

14. A bending strain measurement apparatus according to claim 11, wherein:

said elastic thin plate of said band comprises a rectangular strip of stainless steel secured at a lower end thereof by a fixing means to a member on which said abdomen is arranged at a lower front portion thereof.

15. A bending strain measurement apparatus according to claim 14, wherein:

said plurality of gauges are connected to lead wire portions formed on a flexible printed circuit placed on a low friction sheet coated with adhesive to said band; and said lead wire portions are connected to said measuring device.

16. An abdominal injury presumption apparatus according to claim 4, wherein:

said dummy comprises: a pelvis arranged on legs placed at a lowest position of said dummy; said abdomen placed in front of a spinal column, arranged on said pelvis and made of foam material; and a thorax placed over said abdomen; and said one end of said band is fixed to a member on which said abdomen is arranged.

17. An abdominal injury presumption apparatus according to claim 16, wherein:

said elastic thin plate of said band comprises a rectangular strip of stainless steel secured at a lower end thereof by a fixing means to a front portion of said pelvis so as to extend U-shapedly from a backside to a front side of said abdomen.

18. An abdominal injury presumption apparatus according to claim 17, wherein:

said plurality of gauges comprise foil pieces of metal or foil pieces of single semiconductor crystals attached onto a surface of said band by insulating adhesive with variable intervals in response to an amount of the deformation of said band in the longitudinal direction.

19. An abdominal injury presumption apparatus according to claim 18, wherein:

said foil gauges are connected to lead wire portions each having the same resistance formed on a flexible printed circuit placed on said band with adhesive.

20. A bending strain measurement apparatus according to claim 12, wherein:

said dummy is made of materials having a load-bending characteristic obtained by using a non-antiseptic dead body and a impacting member having a predetermined size and impacting speed.

21. A bending strain measurement apparatus according to claim 20, wherein:

said dummy is made of a foam rubber.

22. A bending strain measurement apparatus according to claim 21, wherein:

said dummy comprises a plurality of laminated sheets having a predetermined thickness.

23. A bending strain measurement apparatus according to claim 22, wherein:

fabric sheets are clamped between said adjacent laminated sheets of said foam rubber.

24. A bending strain measurement apparatus according to claim 21, wherein:

said foam rubber of said dummy has a predetermined hardness within a hardness range of 5–34 in a spring type tester.

25. A bending strain measurement apparatus according to claim 24, wherein:

said foam rubber of said dummy has a predetermined apparent specific gravity within a range of 0.15–0.23.

* * * * *